(12) United States Patent
Sakaguchi et al.

(10) Patent No.: US 10,562,327 B2
(45) Date of Patent: Feb. 18, 2020

(54) IMAGE FORMING APPARATUS AND IMAGE FORMING SYSTEM INCLUDING CLUTCH AND CONTROLLER WHICH CONTROLS WHETHER CLUTCH ALLOWS DRIVE FORCE TO BE TRANSMITTED TO DRIVING MEMBER

(71) Applicant: Brother Kogyo Kabushiki Kaisha, Nagoya-shi, Aichi-ken (JP)

(72) Inventors: Shintaro Sakaguchi, Nagoya (JP); Yohei Hashimoto, Nagakute (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 160 days.

(21) Appl. No.: 15/823,903

(22) Filed: Nov. 28, 2017

(65) Prior Publication Data

US 2018/0147867 A1    May 31, 2018

(30) Foreign Application Priority Data

Nov. 30, 2016    (JP) .................................. 2016-232767

(51) Int. Cl.
*B41J 23/32* (2006.01)
*H04N 1/31* (2006.01)
*B41J 23/02* (2006.01)

(52) U.S. Cl.
CPC ............... *B41J 23/32* (2013.01); *B41J 23/02* (2013.01); *H04N 1/31* (2013.01)

(58) Field of Classification Search
CPC .. B41J 23/32; B41J 23/02; H04N 1/31; H04N 1/0057
USPC .............. 358/1.12, 1.13, 443, 498; 271/9.05, 271/10.05, 10.13
See application file for complete search history.

(56) References Cited

U.S. PATENT DOCUMENTS

| 4,595,189 A * | 6/1986 | Abuyama | .......... G03G 15/6502 |
| | | | 271/164 |
| 6,112,872 A * | 9/2000 | Miwa | .................... F16D 27/112 |
| | | | 192/107 C |

FOREIGN PATENT DOCUMENTS

JP    H08-002735 A    1/1996

* cited by examiner

*Primary Examiner* — Jamares Q Washington
(74) *Attorney, Agent, or Firm* — Banner & Witcoff, Ltd.

(57) ABSTRACT

An image forming system, image forming apparatus and tray for the same are provided. The tray supports sheets and may include a coupling including first and second connectable members, a cam and clutch. The coupling allows the driving force to be transmitted when the second connectable member is in a connected position and block the driving force to be transmitted when the second connectable member is in a disconnected position. The cam is rotatable by the driving force to be in a transmitting or a blocking state. The clutch allows the cam to rotate when activated and prevents the cam from rotating when deactivated. A controller can activate the clutch to transmit or block the driving force to the load and deactivate the clutch when the cam is placed in the transmitting or blocking states.

19 Claims, 14 Drawing Sheets

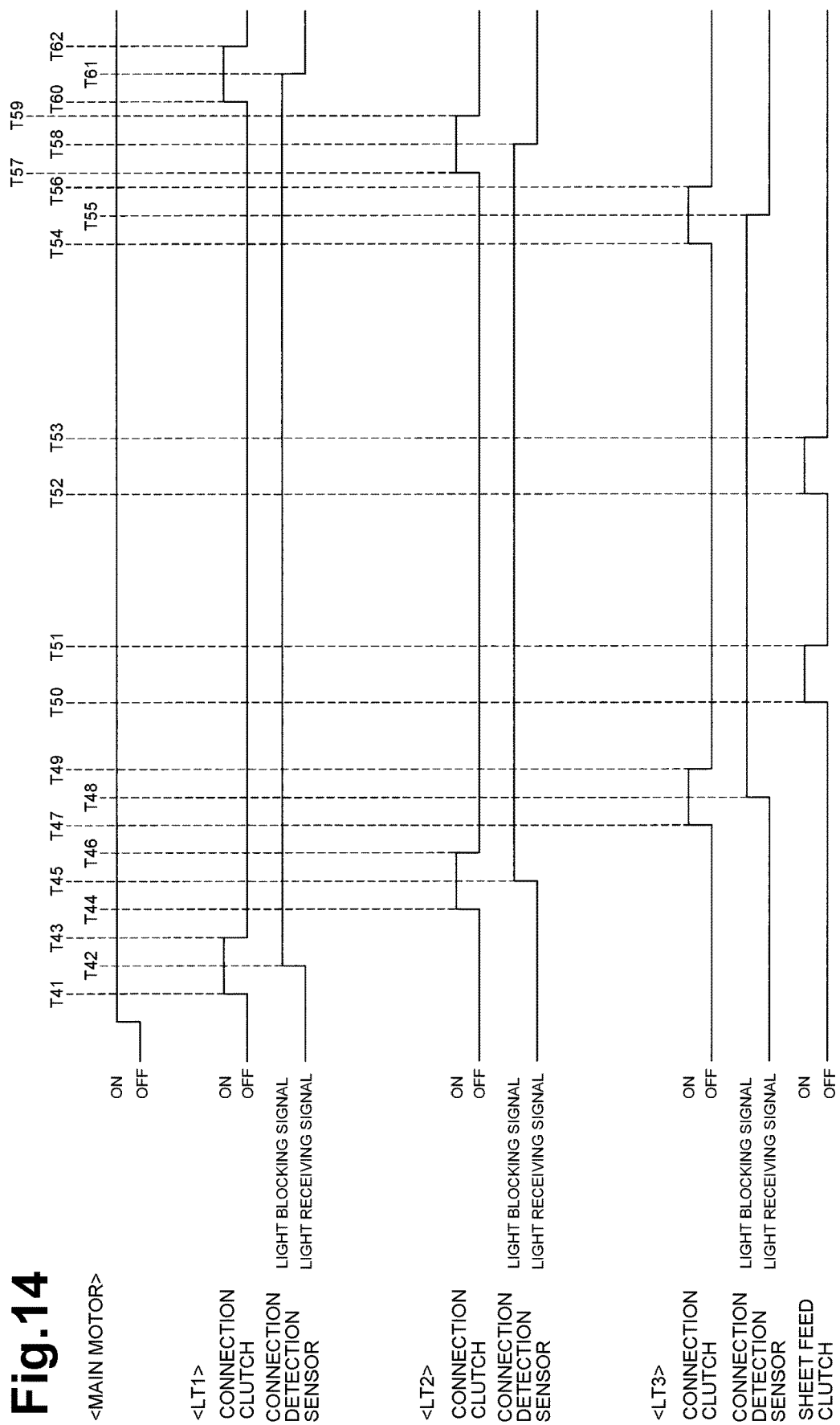

US 10,562,327 B2

IMAGE FORMING APPARATUS AND IMAGE FORMING SYSTEM INCLUDING CLUTCH AND CONTROLLER WHICH CONTROLS WHETHER CLUTCH ALLOWS DRIVE FORCE TO BE TRANSMITTED TO DRIVING MEMBER

CROSS-REFERENCE TO RELATED APPLICATION

This application claims priority from Japanese Patent Application No. 2016-232767 filed on Nov. 30, 2016, the content of which is incorporated herein by reference in its entirety.

FIELD OF DISCLOSURE

Aspects disclosed herein relate to an image forming apparatus and image forming system.

BACKGROUND

Some known image forming apparatuses, such as printers, copying machines, and multifunction devices, include an electromagnetic clutch on a route for transmitting a driving force from a drive source, e.g., a motor, to a driving member, e.g., a conveying roller for conveying a sheet. In such a configuration, transmission and interruption of a driving force from the motor to the conveying roller is implemented by activation and deactivation, respectively, of the electromagnetic clutch.

SUMMARY

Nevertheless, in such a known technique, the electromagnetic clutch may need to be maintained activated while the conveying roller is being driven, which may cause a relatively large amount of power consumption in the electromagnetic clutch.

Accordingly, some embodiments of the disclosure provide for an image forming apparatus in which power to be consumed by an electromagnetic clutch may be reduced.

According to the one or more aspects of the disclosure, power consumption may be reduced as compared with a configuration in which an electromagnetic clutch needs to be maintained activated while a driving member is being driven.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 14 is a timing diagram illustrating of another example of how the image forming apparatus behaves in the connection and disconnection switching process in the illustrative embodiment according to one or more aspects of the disclosure.

DETAILED DESCRIPTION

An illustrative embodiment will be described with reference to the accompanying drawings.

<Configuration of Image Forming Apparatus>

Figure 1:
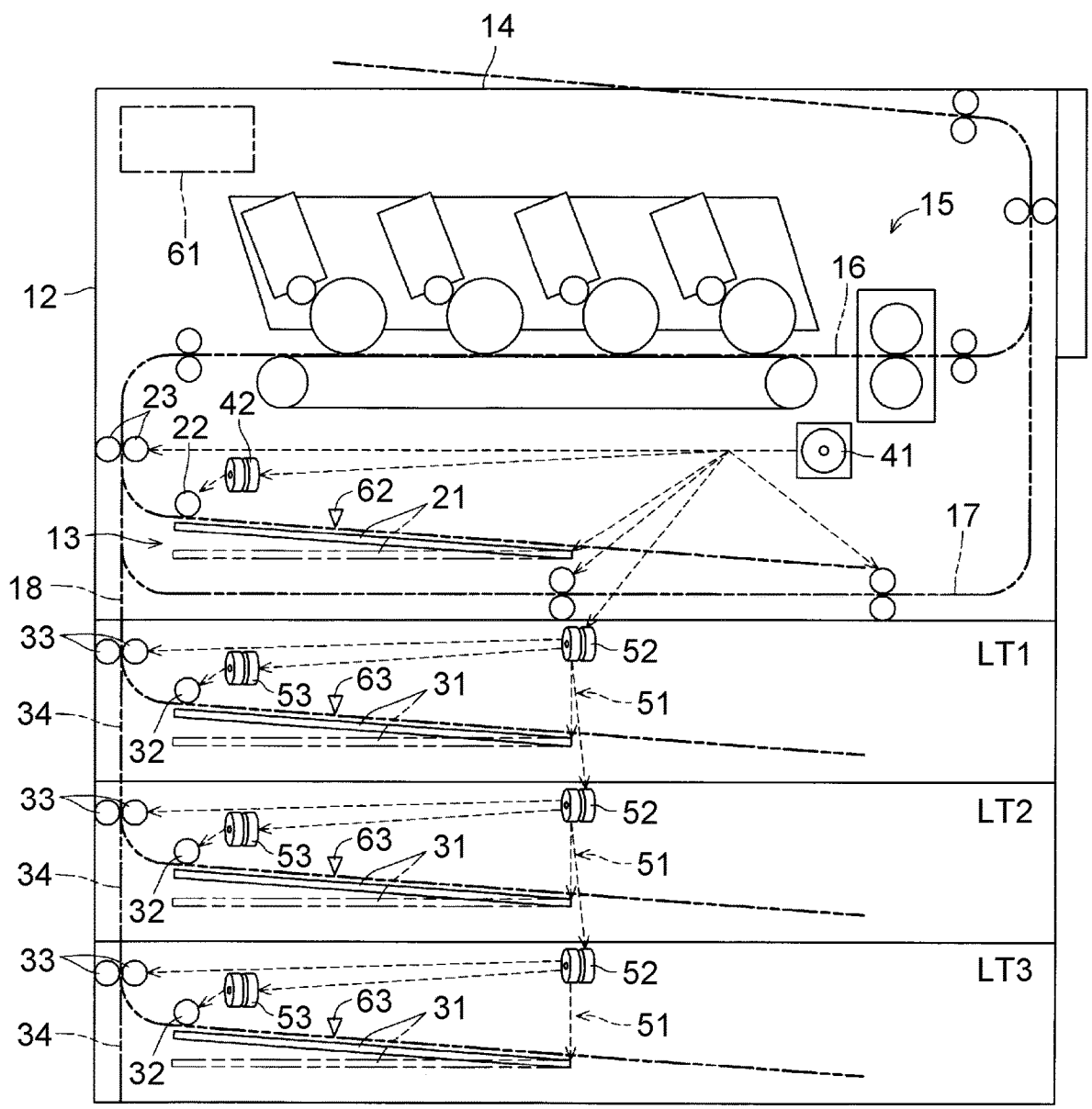
FIG. 1 is a schematic cross-sectional view of a configuration of an image forming apparatus in an illustrative embodiment according to one or more aspects of the disclosure.

As illustrated in FIG. 1, an image forming apparatus 11 includes a housing 12 having a substantially rectangular parallelepiped shape.

The image forming apparatus 11 further includes a feed tray 13 at a bottom of the housing 12. The image forming apparatus 11 further includes a discharge tray 14 at a top of the housing 12. The image forming apparatus 11 further includes an image forming unit 15 in the housing 12. The image forming unit 15 is supported by the housing 12. The image forming unit 15 is configured to form an image onto a sheet. The image forming unit 15 may perform image formation by an electrophotographic image forming method or by an inkjet image forming method. In the illustrative embodiment, as illustrated in FIG. 1, the image forming unit 15 is a tandem type electrophotographic image forming unit that is capable of forming a color image onto a sheet.

The housing 12 has a plurality of sheet conveyance paths, for example, a main path 16, a return path 17, and a connectable path 18, defined therein. The main path 16 extends like a reversed S shape from the feed tray 13 to the discharge tray 14 via the image forming unit 15. The return path 17 is branched from the main path 16 at a position between the discharge tray 14 and the image forming unit 15 to define a different route from the main path 16, and joins the main path 16 at a position between the feed tray 13 and the image forming unit 15. The connectable path 18 is contiguous to the return path 17 at its one end. The other end of the connectable path 18 is exposed at the bottom of the housing 12.

The image forming apparatus 11 may further include one or more optional add-on trays LT attached to the bottom of the housing 12. In a case where the image forming apparatus 11 includes two or more add-on trays LT, the add-on trays LT are disposed one above the other.

In a case where a plurality of add-on trays LT need to be distinguished from each other, the first one (as an example of a first tray) from the top among the plurality of add-on trays LT may be defined as a "first add-on tray LT1", the second one (as another example of the first tray or as an example of a second tray) from the top among the plurality of add-on trays LT may be defined as a "second add-on tray LT2", and the third one (as another example of the second tray) from the top among the plurality of add-on trays LT may be defined as a "third add-on tray LT3". That is, an nth add-on tray LT from the top may be defined as an nth add-on tray LTn (n: natural number). In the following description, therefore, "n" is a value of a variable indicating a tray number that identifies each of one or more add-on trays LT (hereinafter, referred to as the tray number variable). As illustrated in FIG. 1, in the illustrative embodiment, the image forming apparatus 11 includes, for example, three add-on trays LT, which may be first, second, and third add-on trays LT1, LT2, and LT3. Hereinafter, the description will be made based on such a configuration. All of the first, second, and third add-on trays LT1, LT2, and LT3 have the same or similar configuration to each other, and therefore, the description will be made with respect to one of the first, second, and third add-on trays LT1, LT2, and LT3 indistinguishably.

The feed tray 13 includes a sheet support plate 21. The sheet support plate 21 is configured to support one or more sheets in a stacked manner. The feed tray 13 further includes a frame. The sheet support plate 21 is configured to move between an accommodated position and an exposed position. When the sheet support plate 21 is located at the accommodated position, the sheet support plate 21 is entirely accommodated in the frame. When the sheet support plate 21 is located at the exposed position, the sheet support plate 21 is partially or entirely exposed outside of the frame. The sheet support plate 21 is configured to, when the sheet support plate 21 is located at the accommodated position, pivot between a lower position (e.g., a position indicated by a double-dotted-and-dashed line in FIG. 1) and an upper position (e.g., a position indicated by a solid line in FIG. 1) in which a free end of the sheet support plate 21 is located higher than that when the sheet support plate 21 is located at the lower position. The feed tray 13 further includes a feed roller 22. The feed roller 22 is disposed such that its circumferential surface may contact an upwardly-facing surface of a topmost sheet of one or more sheets supported by the sheet support plate 21 that is located at the upper position. With this configuration, when the feed roller 22 rotates with being in contact with the topmost sheet of the one or more sheets supported by the sheet support plate 21 located at the upper position, one or more sheets may be fed, one by one, from the sheet support plate 21. The sheet fed from the sheet support plate 21 is conveyed along the main path 16 by rotation of a conveying roller pair 23.

Similar to the feed tray 13, the add-on tray LT includes a sheet support plate 31. The sheet support plate 31 is configured to support one or more sheets in a stacked manner. The add-on tray LT further includes a frame. The sheet support plate 31 is configured to move between an accommodated position and an exposed position. When the sheet support plate 31 is located at the accommodated position, the sheet support plate 31 is entirely accommodated in the frame. When the sheet support plate 31 is located at the exposed position, the sheet support plate 31 is partially or entirely exposed outside of the frame. The sheet support plate 31 is configured to, when the sheet support plate 31 is located at the accommodated position, pivot between a lower position (e.g., a position indicated by a double-dotted-and-dashed line in FIG. 1) and an upper position (e.g., a position indicated by a solid line in FIG. 1) in which a free end of the sheet support plate 31 is located higher than that when the sheet support plate 31 is located at the lower position. The add-on tray LT includes a feed roller 32 and a conveying roller pair 33. The feed roller 32 is disposed such that its circumferential surface may contact an upwardly-facing surface of a topmost sheet of one or more sheets supported by the sheet support plate 31 that is located at the upper position. With this configuration, when the feed roller 32 rotates while being in contact with the topmost sheet of the one or more sheets supported by the sheet support plate 31 located at the upper position, one or more sheets may be fed, one by one, from the sheet support plate 31. The add-on tray LT has an extension path 34 defined therein. The extension path 34 extends in a top-bottom direction in the add-on tray LT. The extension path 34 allows a sheet fed from the sheet support plate 31 to move therethrough by rotation of the conveying roller pair 33.

The extension path 34 has upper and lower ends. In the first add-on tray LT1, the upper end of the extension path 34 is contiguous to the lower end of the connectable path 18 of the housing 12, and the lower end of the extension path 34 is contiguous to the upper end of the extension path 34 of the second add-on tray LT2 located immediately below the first add-on tray LT1. In the second add-on tray LT2, the lower end of the extension path 34 is contiguous to the upper end of the extension path 34 of the lowest add-on tray (e.g., the third add-on tray) LT3 located immediately below the second add-on tray LT2. Such a configuration therefore enables every sheet that has passed through the extension path 34 of one or more of the add-on trays LT to move to the return path 17 from the extension path 34 of the first add-on tray LT1 via the connectable path 18 of the housing 12 and to further move to the main path 16. Thereafter, the sheet moves along the main path 16.

While a sheet moving along the main path 16 passes through the image forming unit 15, an image is formed onto one (e.g., a first side) of the sides of the sheet. For single-sided printing, an image is formed on a first side of a sheet only and the sheet is then discharged onto the discharge tray 14 through the main path 16. For double-sided printing, an image is formed on a first side of a sheet and the sheet is then conveyed to the return path 17 without being discharged onto the discharge tray 14. Thereafter, the sheet is conveyed along the return path 17 and is further conveyed to the main path 16 again. The sheet is conveyed along the main path 16 with its second side facing upward. Thus, while the sheet passes the image forming unit 15, an image is formed onto the second side of the sheet. The sheet having images on the both sides is then discharged onto the discharge tray 14.

The image forming apparatus 11 further includes a main motor 41 (as an example of a motor) configured to generate a driving force. The main motor 41 is disposed in a housing 12. A driving force generated by the main motor 41 is applied to various driving components disposed in the housing 12. The image forming apparatus 11 further includes a sheet feed clutch 42 on a route for transmitting a driving force to the feed roller 22 from the main motor 41. The sheet feed clutch 42 may be an electromagnetic clutch, and is configured to selectively allow and interrupt transmission of a driving force to the feed roller 22.

The add-on tray LT includes a driving force transmission mechanism 51. The driving force transmission mechanism 51 of the first add-on tray LT1 is configured to receive a driving force from the main motor 41 via a gear (not illustrated) of the housing 12. The driving force transmission mechanism 51 of each of the other add-on trays LT is configured to receive a driving force from the driving force transmission mechanism 51 of a respective add-on tray LT located immediately above. More specifically, for example, the driving force transmission mechanism 51 of the second add-on tray LT2 is configured to receive a driving force from the driving force transmission mechanism 51 of the first add-on tray LT1. The driving force transmission mechanism 51 of the third add-on tray LT3 is configured to receive a driving force from the driving force transmission mechanism 51 of the second add-on tray LT2. The driving force transmission mechanism 51 includes a connection clutch 52 that may be an electromagnetic clutch. The connection clutch 52 is configured to selectively allow and interrupt transmission of a driving force to the sheet support plate 31, the feed roller 32, and the conveying roller pair 33 of the add-on tray LT that includes the connection clutch 52. The connection clutch 52 is further configured to selectively allow and interrupt transmission of a driving force to the driving force transmission mechanism 51 of an immediately below add-on tray LT. The add-on tray LT further includes a sheet feed clutch 53 on a route for transmitting a driving force to the feed roller 32 from the driving force transmission mechanism 51. The sheet feed clutch 53 may be an electromagnetic clutch, and is configured to selectively allow and interrupt transmission of a driving force to the feed roller 32.

The image forming apparatus 11 further includes a controller 61. The controller 61 includes, for example, a CPU, a ROM, and a RAM. The controller 61 is configured to receive detection signals outputted from sheet sensors 62 and 63. The sheet sensor 62 is disposed within the housing 12. The sheet sensor 62 includes, for example, an optical sensor and an actuator. The optical sensor includes a light emitter for emitting light and a photoreceptor for receiving light emitted from the light emitter. The actuator is movable between an unblocking position at which the actuator does not block light traveling from the light emitter to the photoreceptor and a blocking position at which the actuator blocks light traveling from the light emitter to the photoreceptor. The sheet support plate 21 has a particular shape for avoiding contact with the actuator of the sheet sensor 62. More specifically, for example, the sheet support plate 21 has a shape that enables a lower end portion of the actuator of the sheet sensor 62 to be located below a lower surface of the sheet support plate 21 when the sheet support plate 21 is located at the upper position without supporting any sheets thereon. With this configuration, when the sheet support plate 21 supports no sheet regardless of the position of the sheet support plate 21, the actuator of the sheet sensor 62 is always located at the blocking position without moving from the position. When an upper surface of a topmost sheet of one or more sheets supported by the sheet support plate 21 contacts the circumferential surface of the feed roller 22 by movement of the sheet support plate 21 to the upper position, the actuator of the sheet sensor 62 contacts the upper surface of the topmost sheet to move to the unblocking position. That is, the sheet sensor 62 is configured to output various detection signals having different levels in accordance with the position of the actuator of the sheet sensor 62. More specifically, for example, the sheet sensor 62 is configured to, when the sheet support plate 21 is in one state supporting one or more sheets thereon and an upper surface of a topmost sheet of the one or more sheets is in contact with the feed roller 22, output one detection signal. The sheet sensor 62 is further configured to, when the sheet support plate 21 is in the other state, to output another detection signal different from the one detection signal. The sheet sensor 63 and the sheet support plate 31 are disposed in each add-on tray LT and have the same or similar configuration as the sheet sensor 62 and the sheet support plate 21 of the feed tray 13. The sheet sensor 63 is configured to output various detection signals having different levels in accordance with the position of the actuator of the sheet sensor 63. More specifically, for example, the sheet sensor 63 is configured to, when the sheet support plate 31 is in one state supporting one or more sheets thereon and an upper surface of a topmost sheet of the one or more sheets is in contact with the feed roller 32, output one detection signal. The sheet sensor 63 is further configured to, when the sheet support plate 31 is in the other state, to output another detection signal different from the one detection signal. The controller 61 is further configured to receive other detection signals outputted from a connection detection sensor 102. The controller 61 is further configured to control driving of the main motor 41 based on a received signal to control activation and deactivation of each of the sheet feed clutches 42 and 53 and the connection clutches 52.

<Driving Force Transmission Mechanism>

Figure 2:
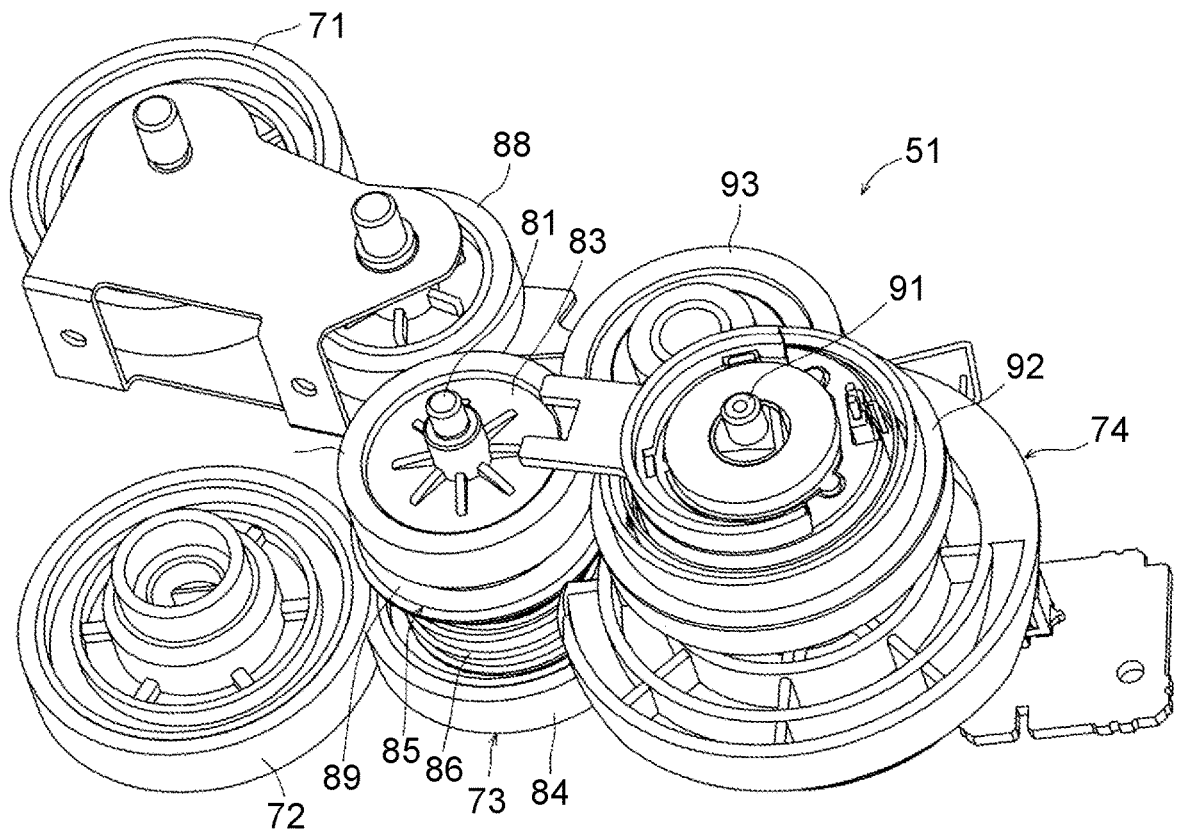
FIG. 2 is a perspective view of a driving force transmission mechanism included in an add-on tray in the illustrative embodiment according to one or more aspects of the disclosure.

As illustrated in FIG. 2, the driving force transmission mechanism 51 includes an input gear 71, an output gear 72, a coupling 73, and a cam 74.

The input gear 71 is for receiving a driving force inputted thereto. The input gear 71 of the driving force transmission mechanism 51 of the first add-on tray LT1 may mesh with the gear (not illustrated) of the housing 12, and is configured to receive a driving force inputted from the gear. The output gear 72 is for outputting a driving force therefrom. The input gear 71 of the driving force transmission mechanism 51 of the second add-on tray LT2 may mesh with the output gear 72 of the first add-on tray LT1, which is disposed immediately above the second add-on tray LT2, and is configured to receive the driving force inputted from the output gear 72 of the first add-on tray LT1. The input gear 71 of the driving force transmission mechanism 51 of the third add-on tray LT3 may mesh with the output gear 72 of the second add-on tray LT2, which is disposed immediately above the third add-on tray LT3, and is configured to receive the driving force inputted from the output gear 72 of the second add-on tray LT2. The output gear 72 is configured to further transmit the received driving force to the sheet support plate 31. The output gear 72 is further configured to transmit the received driving force to the feed roller 32 via the sheet feed clutch 53 and the conveying roller pair 33. The input gear 71 is configured to rotate clockwise in FIG. 2. The output gear 72 is configured to rotate counterclockwise in FIG. 2.

Figure 3:
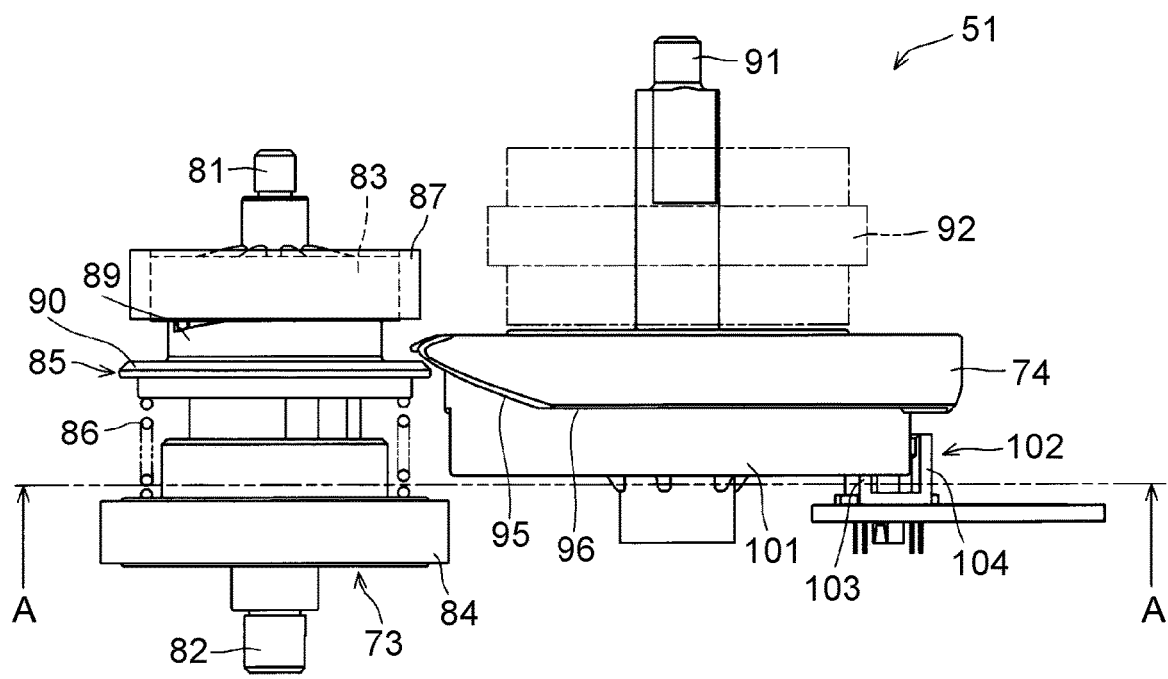
FIG. 3 is a side view of the driving force transmission mechanism in the illustrative embodiment according to one or more aspects of the disclosure, wherein a connectable member is located at a connected position.

The coupling 73 is configured to selectively allow and interrupt transmission of a driving force from the input gear 71 to the output gear 72 in the driving force transmission mechanism 51. As illustrated in FIG. 3, the coupling 73 includes a first rotation shaft 81, a second rotation shaft 82, a connectable member 83, an output gear 84, a connectable member 85, and a coil spring 86. The second rotation shaft 82 is coaxial with the first rotation shaft 81. The connectable member 83 is rotatable on an axis of the first rotation shaft 81. The output gear 84 is rotatable on an axis of the second rotation shaft 82. The output gear 84 is fixed to the second rotation shaft 82 so as not to move relative to the second rotation shaft 81 in an axial direction of the second rotation shaft 82. The connectable member 85 is disposed between the connectable member 83 and the output gear 84. The coil spring 86 is disposed between the output gear 84 and the connectable member 85.

The coupling 73 further includes an input gear 87, which has a hollow cylindrical shape and is fit around the connectable member 83 so as not to rotate relative to the connectable member 83. The input gear 87 has a plurality of teeth on its circumference. As illustrated in FIG. 2, the driving force transmission mechanism 51 further includes a first idle gear 88. The first idle gear 88 is in mesh with the input gear 87 of the coupling 73. The first idle gear 88 is also in mesh with the input gear 71. Thus, a driving force inputted to the input gear 71 is transmitted to the first idle gear 88 to cause the first idle gear 88 to rotate counterclockwise in FIG. 2. The driving force inputted to the first idle gear 88 is further transmitted to the input gear 87 of the coupling 73 to cause the input gear 87 to rotate clockwise in FIG. 2.

The output gear 84 of the coupling 73 is in mesh with the output gear 72.

Figure 5:
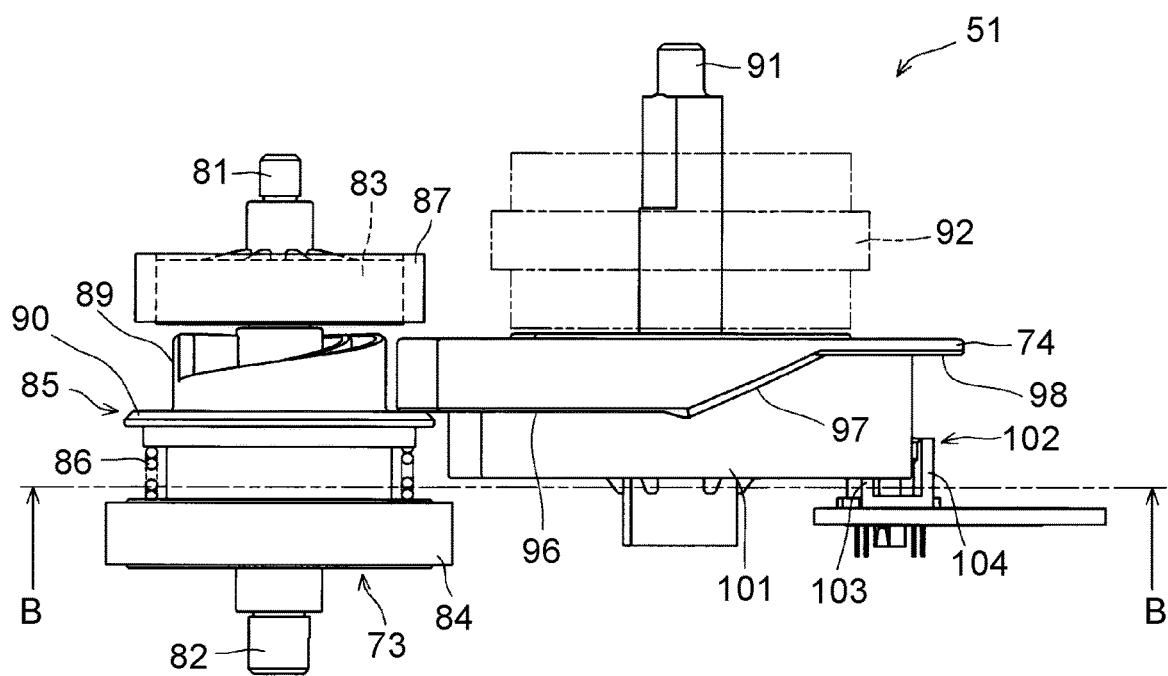
FIG. 5 is a side view of the driving force transmission mechanism in the illustrative embodiment according to one or more aspects of the disclosure, wherein the connectable member is located at a disconnected position.

As illustrated in FIGS. 3 and 5, the connectable member 85 includes an engageable portion 89 and a flange portion 90. The engageable portion 89 is engageable with the connectable member 83. In the connectable member 85, the flange portion 90 is located closer to the output gear 84 of the coupling 73 than the engageable portion 89. The flange portion 90 has a substantially disc shape and has a larger diameter than the engageable portion 89 to protrude relative to a circumference of the engageable portion 89. The connectable member 85 is movable between a connected position and a disconnected position in the axial direction of the second rotational shaft 82. At the connected position (refer to FIG. 3), the engageable portion 89 is in engagement with the connectable member 83 and thus the connectable member 85 and the connectable member 83 are connected to each other. At the disconnected position (refer to FIG. 5), the engageable portion 89 is not in engagement with the connectable member 83 and thus the connectable member 85 and the connectable member 83 are separated from each other.

As illustrated in FIG. 3, the coil spring 86 is disposed around the second rotation shaft 82. The coil spring 86 has one end, which is connected to the output gear 84 of the coupling 73, and the other end, which is connected to the connectable member 85. The connectable member 85 is urged in a direction away from the output gear 84 of the coupling 73, i.e., toward the connectable member 83, by an elastic force of the coil spring 86.

The cam 74 is rotatable on an axis of a third rotation shaft 91 that extends parallel to the first rotation shaft 81 and the second rotation shaft 82. The third rotation shaft 91 supports a cam drive gear 92, which is rotatable relative to the third rotation shaft 91. As illustrated in FIG. 2, the driving force transmission mechanism 51 further includes a second idle gear 93. The second idle gear 93 is in mesh with the cam drive gear 92. The second idle gear 93 is also in mesh with the input gear 87 of the coupling 73. With this configuration, a driving force of the input gear 87 of the coupling 73 is transmitted to the second idle gear 93 to cause the second idle gear 93 to rotate counterclockwise in FIG. 2. The driving force inputted to the second idle gear 93 is further transmitted to the cam drive gear 92 to cause the cam drive gear 92 to rotate in the same direction as the rotating direction of the input gear 87 of the coupling 73, that is, clockwise in FIG. 2.

Figure 4:
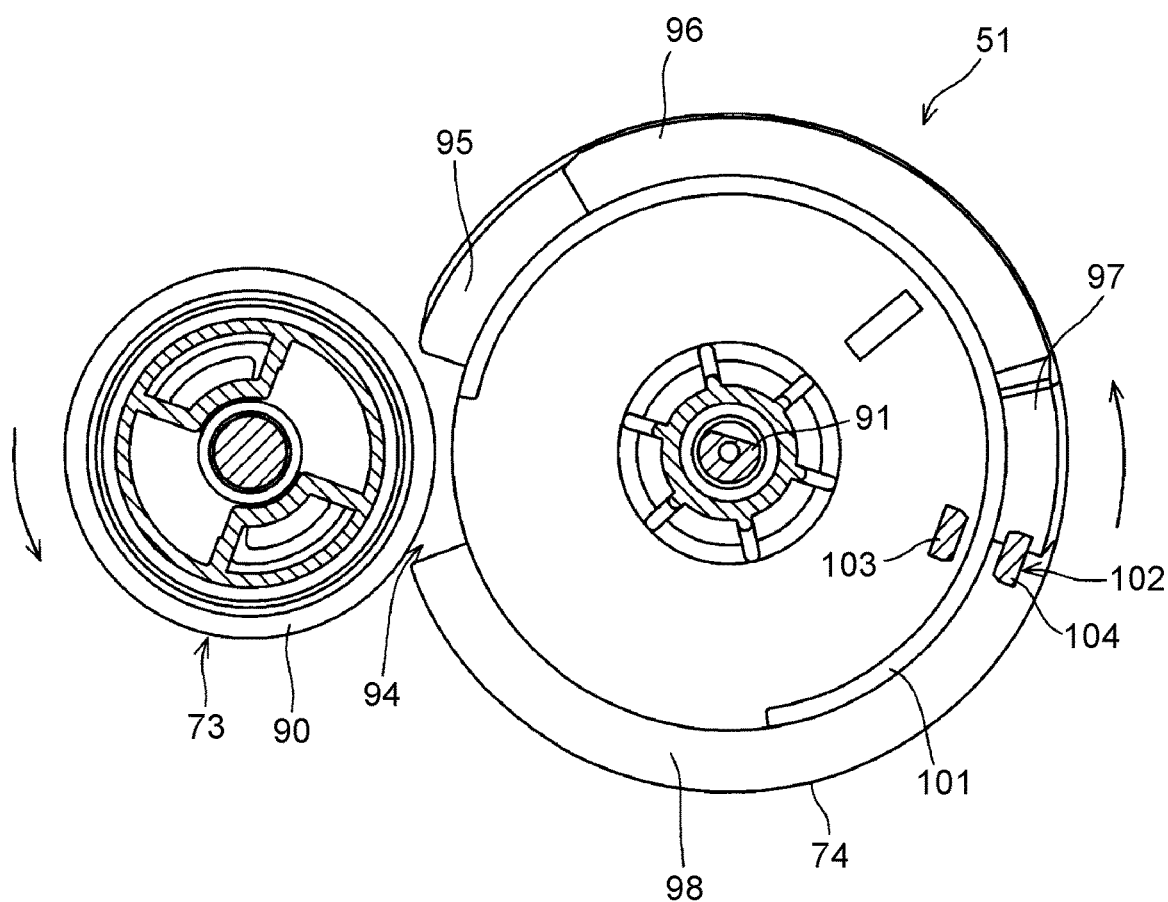
FIG. 4 is a cross-sectional view of the driving force transmission mechanism taken along line A-A of FIG. 3 in the illustrative embodiment according to one or more aspects of the disclosure.

The cam 74 has a substantially disc shape and includes a circumferential projecting portion. The cam 74 is disposed such that a portion of the circumferential projecting portion is positioned between the connectable member 83 and the connectable member 85 in the axial direction of the third rotation shaft 91. As illustrated in FIG. 4, the cam 74 has a cut portion 94 in the circumferential projecting portion. The cut portion 94 extends in a circumferential direction of the cam 74. The cam 74 has a surface, which may partially face the flange portion 90. The flange-facing surface of the cam 74 includes, at the circumferential projecting portion, a first inclined surface 95, a contactable surface 96, a second inclined surface 97, and a noncontact surface 98, in this order from the cut portion 94 in a clockwise direction in FIG. 4. As illustrated in FIG. 5, a thickness of the cam 74 between the contactable surface 96 and its opposite surface of the cam 74 is greater than a thickness of the cam 74 between the noncontact surface 98 and its opposite surface of the cam 74. The cam 74 is positioned in the axial direction of the third rotation shaft 91 such that, when the contactable surface 96 of the cam 74 faces the flange portion 90 of the connectable member 85, the cam 74 contacts the flange portion 90 (refer to FIG. 5), and when the noncontact surface 98 of the cam 74 faces the flange portion 90 of the connectable member 85, the cam 74 does not contact the flange portion 90 (refer to FIG. 3).

The cam 74 further includes an arc-shaped light-blocking wall 101 protruding from the flange-facing surface. The light-blocking wall 101 is disposed closer to the third rotational shaft 91 than the circumferential projecting portion of the cam 74 in its diameter direction. The connection detection sensor 102 is provided in connection with the light-blocking wall 101. The connection detection sensor 102 may be a transmissive optical sensor (i.e., a photosensor), and includes a light emitter 103 and a photoreceptor 104. The light emitter 103 is configured to emit sensor light. The photoreceptor 104 is configured to receive sensor light from the light emitter 103. The connection detection sensor 102 is disposed such that the light-blocking wall 101 may temporarily block sensor light that travels on an optical path from the light emitter 103 to the photoreceptor 104 during rotation of the cam 74. The position and length of the light-blocking wall 101 in the circumferential direction and the position of the connection detection sensor 102 in the circumferential direction are determined as described below. When the contactable surface 96 of the cam 74 starts contacting the flange portion 90 of the connectable member 85 by counterclockwise rotation of the cam 74 in FIGS. 4 and 6 (i.e., by clockwise rotation of the cam 74 in FIG. 2), a trailing end of the light-blocking wall 101 exits the optical path of the sensor light of the connection detection sensor 102 to allow the sensor light to travel from the light emitter 103 to the photoreceptor 104. When a boundary between the second inclined surface 97 and the noncontact surface 98 reaches the flange portion 90 of the connectable member 85 by further rotation of the cam 74, a leading end of the light-blocking wall 101 enters the optical path of the sensor light of the connection detection sensor 102 to block the sensor light that travels from the light emitter 103 to the photoreceptor 104.

Figure 6:
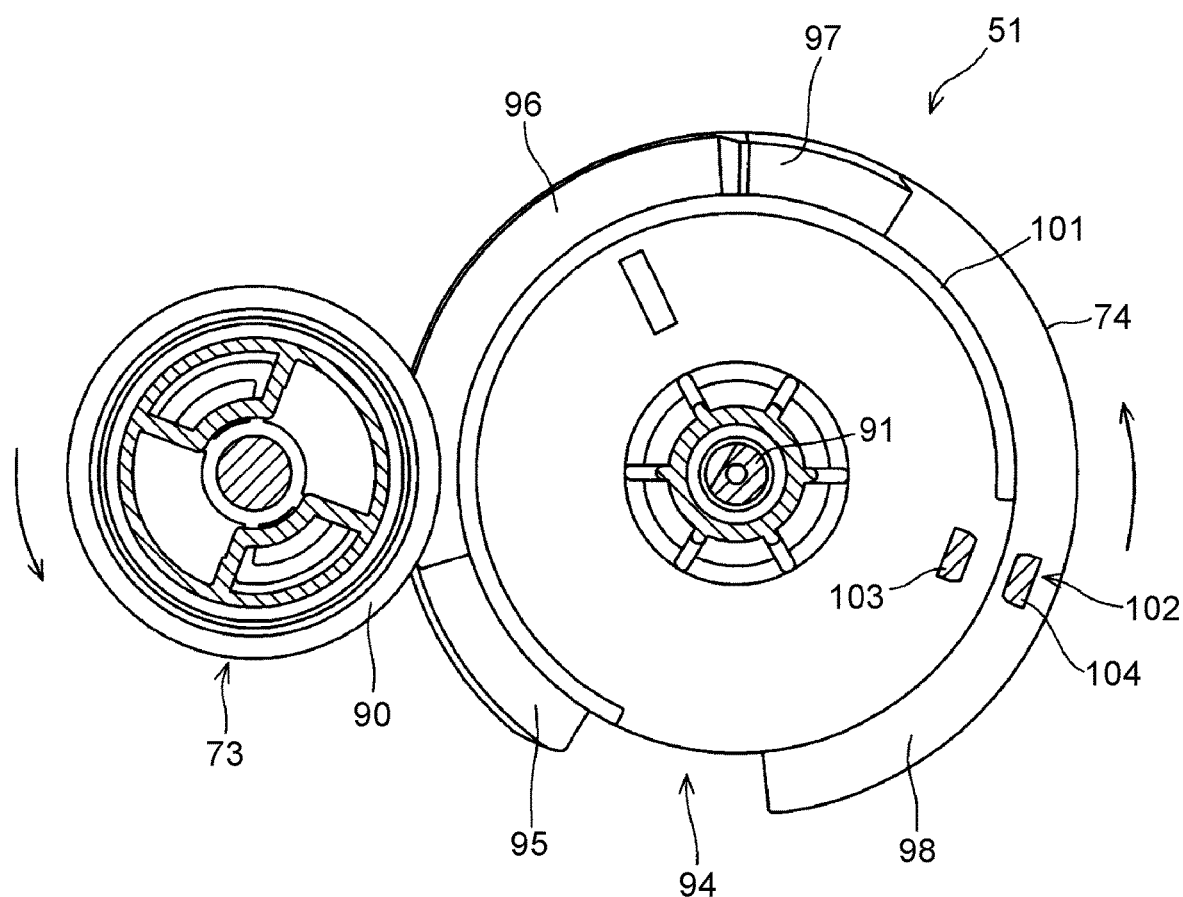
FIG. 6 is a cross-sectional view of the driving force transmission mechanism taken along line B-B of FIG. 5 in the illustrative embodiment according to one or more aspects of the disclosure.

As illustrated in FIG. 6, the connection detection sensor 102 is configured to, when the photoreceptor 104 receives the sensor light from the light emitter 103 without the sensor light being blocked by the light-blocking wall 101, output a detection signal having a first level (hereinafter, referred to as a light receiving signal) to the controller 61. As illustrated in FIG. 4, the connection detection sensor 102 is further configured to, when the photoreceptor 104 does receive sensor light from the light emitter 103 due to blocking of the sensor light of the connection detection sensor 102 by the light-blocking wall 101, output, to the controller 61, a detection signal having a second level (hereinafter, referred to as a light blocking signal) that is different from the light receiving signal.

The connection clutch 52 (refer to FIG. 1) is configured to, when the connection clutch 52 is activated, maintain the cam 74 and the cam drive gear 92 (refer to FIGS. 3 and 5) in a connected state in which the cam 74 and the cam drive gear 92 are connected with each other so as not to rotate relative to each other, and when the connection clutch 52 is deactivated, maintain the cam 74 and the cam drive gear 92 in a disconnected state in which the cam 74 and the cam drive gear 92 are disconnected from each other.

<Behavior of Driving Force Transmission Mechanism>

In each of the add-on trays LT, the driving force transmission mechanism behaves in the same manner, and therefore, descriptions will be made on the add-on tray LT2 as an example. As illustrated in FIG. 5, in a state where the cam 74 is at a standstill with the contactable surface 96 contacting the flange portion 90 of the connectable member 85 of the coupling 73, the connectable member 85 is located at a position nearest to the output gear 84 of the coupling 73 in the disconnected position and is separated from the connectable member 83 while being pressed toward the output gear 84 of the coupling 73 by the cam 74 against the urging force of the coil spring 86. Therefore, if a driving force is inputted to the input gear 87 of the coupling 73, transmission of the driving force is blocked to the connectable member 85 and therefore the output gear 84 of the coupling 73 connected to the connectable member 85 via the coil spring 86 does not rotate. In such a state, as illustrated in FIG. 6, the light-blocking wall 101 does not block sensor light of the connection detection sensor 102 and thus the connection detection sensor 102 outputs a light receiving signal to the controller 61.

Figure 7:
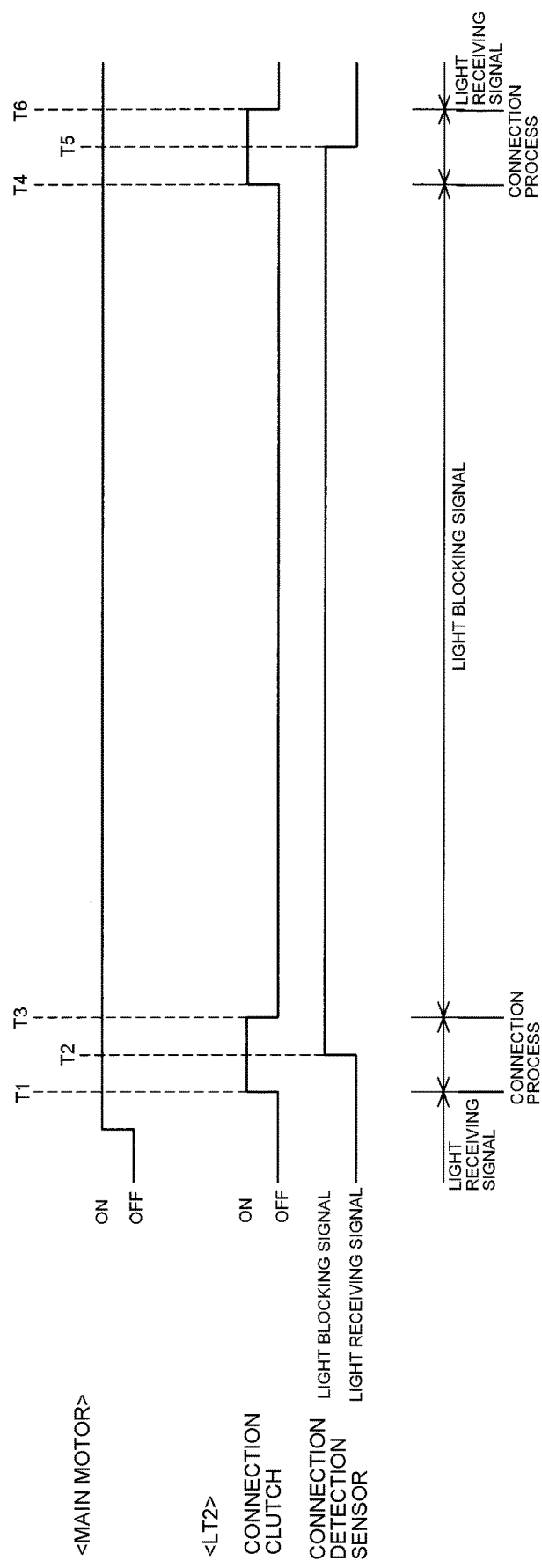
FIG. 7 is a timing diagram illustrating how the driving force transmission mechanism behaves in the illustrative embodiment according to one or more aspects of the disclosure.

As illustrated in FIG. 7, in response to activation (e.g., ON) of the main motor 41 (refer to FIG. 1), the connection clutch 52, in which the connectable member 85 is separated from the connectable member 83, becomes activated (e.g., ON) (e.g., timing T1). In response, the cam 74 and the cam drive gear 92 are connected to each other. Thus, the cam 74 starts rotating clockwise in FIG. 2 by a driving force transmitted from the input gear 71 to the cam drive gear 92 via the first idle gear 88, the input gear 87 of the coupling 73, and the second idle gear 93.

In accordance with the rotation of the cam 74, the contactable surface 96 slides relative to the flange portion 90 of the coupling 73. Then, a boundary between the contactable surface 96 and the second inclined surface 97 reaches the flange portion 90 of the connectable member 85 of the coupling 73. As the cam 74 further rotates, the second inclined surface 97 slides relative to the flange portion 90 and therefore the connectable member 85 starts moving toward the connectable member 83 by the urging force of the coil spring 86. When a boundary between the second inclined surface 97 and the noncontact surface 98 reaches the flange portion 90 of the connectable member 85 of the coupling 73 by the further rotation of the cam 74, the connectable member 85 is located at the connected position from the disconnected position and thus is connected to the connectable member 83. Further, at that time, the light-blocking wall 101 starts blocking sensor light of the connection detection sensor 102, and therefore, the connection detection sensor 102 starts outputting a light blocking signal to the controller 61 (e.g., timing T2). In other words, the detection signal outputted from the connection detection sensor 102 is changed to the light blocking signal from the light receiving signal.

Upon lapse of a first period from the timing at which the detection signal outputted from the connection detection sensor 102 was changed from the light receiving signal to the light blocking signal, the connection clutch 52 becomes deactivated (e.g., OFF) (e.g., timing T3). Thus, the cam 74 and the cam drive gear 92 are disconnected from each other to block the transmission of the driving force from the cam drive gear 92 to the cam 74. Therefore, the cam 74 stops rotating with the noncontact surface 98 facing the flange portion 90 of the connectable member 85 of the coupling 73. A duration of the first period from timing T2 to timing T3 may be shorter than a duration from the timing at which the boundary between the second inclined surface 97 and the noncontact surface 98 reaches the flange portion 90 by the rotation of the cam 74 to the timing at which a boundary between the noncontact surface 98 and the cut portion 94 reaches the flange portion 90. For example, the duration of the first period may be half of such a duration. As a result, the cam 74 may be stopped with the noncontact surface 98 facing the flange portion 90 while the boundary between the second inclined surface 97 and the noncontact surface 98 does not face the flange portion 90. Therefore, the driving force transmission mechanism 51 is maintained in a driving force transmitting state in which the connectable member 85 is connected to the connectable member 83 at the connected position reliably and a driving force is allowed to be transmitted from the input gear 71 to the output gear 72.

In the state where the connectable member 85 is connected to the connectable member 83, the driving force is transmitted from the input gear 71 to the input gear 87 of the coupling 73 via the first idle gear 88 and is further transmitted to the connectable member 85 from the input gear 87. Thus, the output gear 84, the connectable member 85, and the coil spring 86 of the coupling 73 rotate clockwise in FIG. 2 together by the driving force. The driving force of the output gear 84 of the coupling 73 is transmitted to the output gear 72 to cause the output gear 72 to rotate counterclockwise in FIG. 2. The driving force of the output gear 72 is further transmitted to the sheet support plate 31, the feed roller 32 and the conveying roller pair 33 of the add-on tray LT that includes the output gear 72, and also to the input gear 71 of the immediately-below add-on tray LT.

For blocking the transmission of the driving force from the input gear 71 to the output gear 72, the connection clutch 52 becomes activated (e.g., timing T4). In response, the cam 74 and the cam drive gear 92 are connected to each other and the driving force is transmitted to the cam drive gear 92 to rotate the cam 74 clockwise in FIG. 2.

In accordance with the rotation of the cam 74, the cam 74 changes from a state in which the noncontact surface 98 faces the flange portion 90 of the connectable member 85 of the coupling 73 to another state in which the cut portion 94 of the cam 74 faces the flange portion 90 (refer to FIG. 4).

As the cam 74 further rotates, the first inclined surface 95 slides relative to the flange portion 90 and presses the flange portion 90 by a repulsive force against the urging force of the coil spring 90 to move the connectable member 85 toward the output gear 84 of the coupling 73. Thus, the connectable member 85 moves to the disconnected position from the connected position and stays at the disconnected position. When the boundary between the first inclined surface 95 and the contactable surface 96 reaches the flange portion 90, the connectable member 85 is located at the position nearest to the output gear 84 of the coupling 73 in the disconnected position and the connectable member 85 and the connectable member 83 are disconnected or separated from each other. Further, at that time, the trailing end of the light-blocking wall 101 comes out of the optical path of the sensor light of the connection detection sensor 102 to allow the sensor light to travel from the light emitter 103 to the photoreceptor 104 and therefore the detection signal outputted from the connection detection sensor 102 is changed from the light blocking signal to the light receiving signal (e.g., timing T5).

Upon lapse of the first period from the timing at which the detection signal outputted from the connection detection sensor 102 was changed from the light blocking signal to the light receiving signal, the connection clutch 52 becomes deactivated (e.g., OFF) (e.g., timing T6). Thus, the cam 74 and the cam drive gear 92 are disconnected from each other to block the transmission of the driving force from the cam drive gear 92 to the cam 74. Therefore, the cam 74 stops rotating with the contactable surface 96 facing the flange portion 90 of the connectable member 85 of the coupling 73. A duration of the first period from timing T5 to timing T6 may be shorter than a duration from the timing at which the boundary between the first inclined surface 97 and the contactable surface 96 reaches the flange portion 90 by the rotation of the cam 74 to the timing at which a boundary between the contactable surface 96 and the second inclined surface 97 reaches the flange portion 90. For example, the duration of the first period may be half of such a duration. As a result, the cam 74 may be stopped with the contactable surface 96 facing the flange portion 90 while the boundary between the first inclined surface 95 and the contactable surface 96 does not face the flange portion 90. Therefore, the driving force transmission mechanism 51 is reliably maintained in a driving force blocking state in which the connectable member 85 is separated from connectable member 83 in the disconnected position reliably and the transmission of the driving force from the input gear 71 to the output gear 72 is blocked. In the illustrative embodiment, the duration of the first period from timing T2 to timing T3 is equal to the duration of the first period from timing T5 to timing T6. Nevertheless, in other embodiments, for example, the duration of the first period from timing T2 to timing T3 may be different from (e.g., longer than or shorter than) the duration of the first period from timing T5 to timing T6.

<Connection and Disconnection Switching Process>

Figure 8:
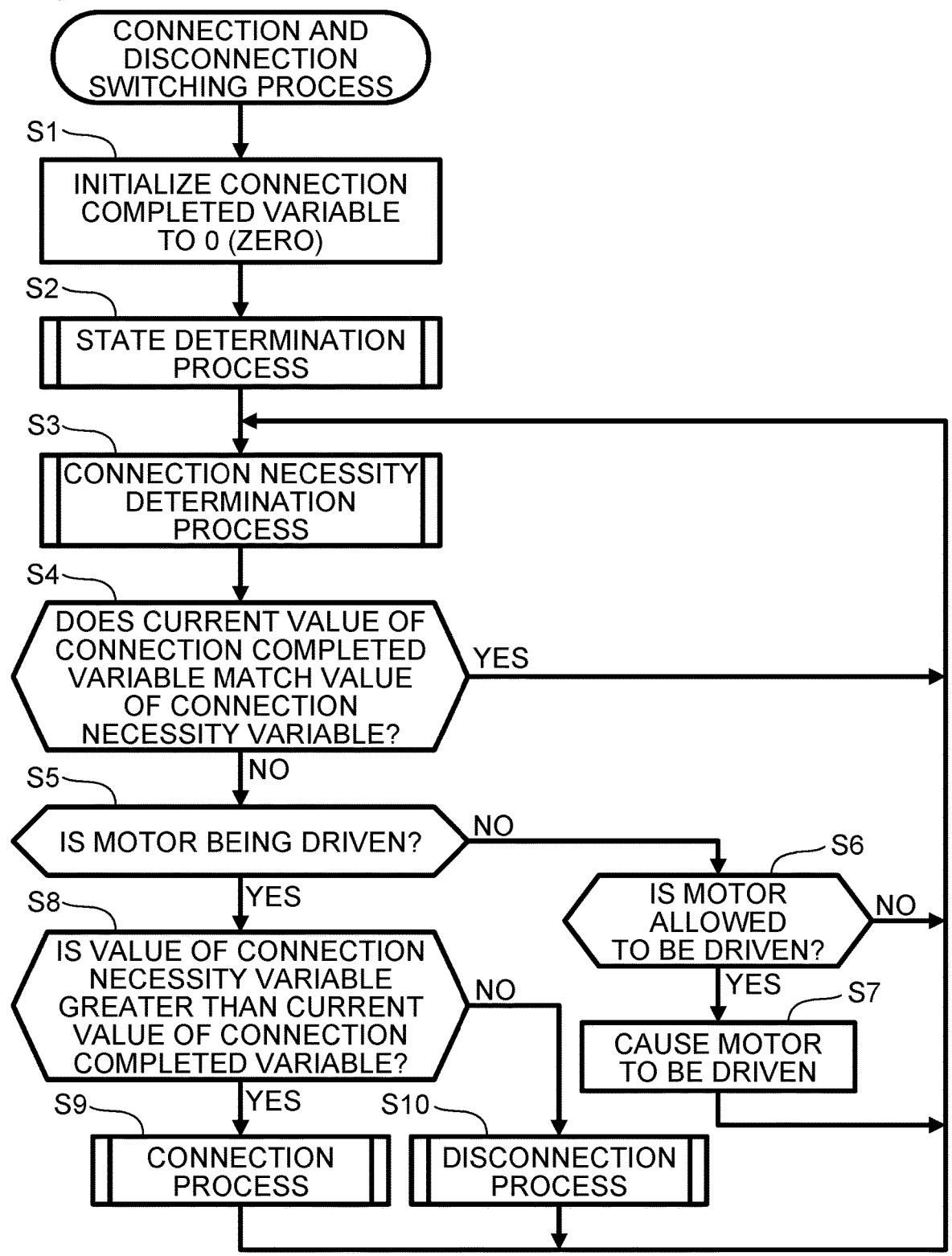
FIG. 8 is a flowchart of a connection and disconnection switching process in the illustrative embodiment according to one or more aspects of the disclosure.

In response to power-on of the image forming apparatus 11 or in response to recovery from an error which interrupts image formation, the controller 61 executes a connection and disconnection switching process in FIG. 8. In the connection and disconnection switching process, the controller 61 examines the position of the connectable member 85 of the driving force transmission mechanism 51 and the position of the sheet support plate 31 in each of the add-on trays LT, and determines whether a sheet feed request has been issued and whether a sheet is being conveyed. Thereafter, the controller 61 determines, based on those results, whether the connectable member 85 needs to be moved to the connected position or the disconnected position. Further, the controller 61 controls the driving force transmission mechanism 51 based on the determination results.

As described above, when the cam 74 is rotating from the timing at which the boundary between the first inclined surface 95 and the contactable surface 96 reaches the flange portion 90 to the timing at which the boundary between the second inclined surface 97 and the noncontact surface 98 reaches the flange portion 90, the light-blocking wall 101 does not block the sensor light of the connection detection sensor 102 to allow the sensor light to travel in the connection detection sensor 102. Thus, the connection detection sensor 102 outputs a light receiving signal to the controller 61.

That is, the connection detection sensor 102 outputs a light receiving signal when the contactable surface 96 faces the flange portion 90 and thus the connectable member 85 is located at the position nearest to the output gear 84 of the coupling 73 in the disconnected position and when the second inclined surface 97 faces the flange portion 90 and thus the connectable member 85 is moving from the disconnected position toward the connected position (refer to FIG. 6). Therefore, while the connection detection sensor 102 outputs a light receiving signal, the connectable member 85 is located in the disconnected position.

Nevertheless, when the cam 74 is rotating from the timing at which the boundary between the second inclined surface 97 and the noncontact surface 98 reaches the flange portion 90 to the timing at which the boundary between the first inclined surface 95 and the contactable surface 96 reaches the flange portion 90, the light-blocking wall 101 blocks the sensor light traveling in the connection detection sensor 102 and thus the connection detection sensor 102 outputs a light blocking signal. That is, the connection detection sensor 102 outputs a light blocking signal when the noncontact surface 98 or the cut portion 94 faces the flange portion 90 and thus the connectable member 85 is located at the connected position and when the first inclined surface 95 faces the flange portion 90 and thus the connectable member 85 is moving toward the position nearest to the output gear 84 of the coupling 73 in the disconnected position (refer to FIG. 4). Therefore, while the connection detection sensor 102 outputs a light blocking signal, the connectable member 85 is not always located at the connected position or is not assured of being located at the connected position. That is, while the connection detection sensor 102 outputs a light blocking signal, the connectable member 85 may be moving toward the position nearest to the output gear 84 of the coupling 73 in the disconnected position. While the cam 74 rotates by activation of the connection clutch 52, for example, accidental power off of the image forming apparatus 11 may occur or an error, which interrupts image formation, may occur due to movement of the sheet support plate 31 of the add-on tray LT to the exposed position. In such a case, even if the connection detection sensor 102 outputs a light blocking signal in response to power-on of the image forming apparatus 11 or in response to recovery from such an error, the connectable member 85 is not assured of being located at the connected position. If a driving force is attempted to be transmitted to target components (e.g., the sheet support plate 31, the feed roller 32, and the conveying roller pair 33 of the add-on tray LT including the driving force transmission mechanism 51 having the connectable member 85, and the input gear 71 of the driving force transmission mechanism 51 of the immediately-below add-on tray LT) under such a condition via the driving force transmission mechanism 51 including the connectable member 85 that is not assured of being located at the connected position, the driving force might not be transmitted to the target components because the connectable member 85 is located at the disconnected position actually.

Therefore, the controller 61 executes a state determination process (e.g., step S2 (FIG. 9)). In the state determination process, the controller 61 determines, with respect to each of one or more add-on trays LT, whether the target add-on tray LT is in an unknown state in which the connectable member 85 is not assured of being located at the connected position even if the controller 61 has detected a light blocking signal outputted from the connection detection sensor 102.

Subsequent to the state determination process (e.g., step S2), the controller 61 executes a connection necessity determination process (e.g., step S3 (FIG. 10)). In the connection necessity determination process, the controller 61 determines, with respect to each of the one or more add-on trays LT, whether a connection process (e.g., step S9 (FIG. 11)), in which the connectable member 85 of the driving force transmission mechanism 51 is moved to the connected position, needs to be executed and identifies the lowest add-on tray LT among one or more add-on trays LT whose connectable member 85 needs to be moved to the connected position.

Subsequent to the connection necessity determination process (e.g., step S3), in one case, the controller 61 executes the connection process (e.g., step S9 (FIG. 11)) for one or more add-on trays LT whose connectable member 85 needs to be moved to the connected position. In another case, the controller 61 executes a disconnection process (e.g., step S10 (FIG. 12) or step S913 (FIG. 12) in the connection process (FIG. 11)) for one or more add-on trays LT whose connectable member 85 needs to be moved to the disconnected position. In the disconnection process, the connectable member 85 is moved to the disconnected position.

The controller 61 monitors the state of each of the one or more add-on trays LT and repeats the connection necessity determination process and appropriate one of the connection process and the disconnection process until the power of the image forming apparatus 11 is turned off or until an error, which interrupts image formation, occurs.

In the connection and disconnection switching process, the controller 61 initializes a value of a connection completed variable to 0 (zero) (e.g., step S1). The connection completed variable is stored in the RAM. The connection completed variable is a value indicating how many add-on trays LT have undergone the connection process from the top after the lowest add-on tray LT among the one or more add-on trays LT which need to undergo the connection process was identified. When the power of the image forming apparatus 11 was just turned on or when the image forming apparatus 11 was just recovered from an error which interrupts image formation, the connection necessity determination process has not been executed yet. Therefore, the controller 61 initializes the connection completed variable to 0 (zero) in step S1.

Subsequent to S1, in step S2, the controller 61 executes the state determination process (e.g., step S2).

Subsequent to the state determination process of step S2, the controller 61 executes the connection necessity determination process (e.g., step S3). In the connection necessity determination process, a connection necessity variable stored in RAM is assigned a value corresponding to the lowest add-on tray LTn among the one or more add-on trays LT whose connectable member 85 needs to be moved to the connected position. Subsequent to step S3, the controller 60 determines whether the current value of the connection completed variable matches the value of the connection necessity variable (e.g., step S4).

If the controller 61 determines that the current value of the connection completed variable does not match the value of the connection necessity variable (e.g., NO in step S4), the controller 61 determines whether the main motor 41 is being driven (e.g., step S5). Non-matching of the current value of the connection completed variable and the value of the connection necessity variable means that there is one or more add-on trays LT that need to undergo the connection process, but have not undergone the connection process yet, or there is one or more add-on trays LT that need to undergo the disconnection process because of elimination of the need to retain the connectable member 85 of the driving force transmission mechanism 51 at the connected position. The connection process and the disconnection process both require the main motor 41 to be driven when executed. Therefore, the controller 61 determines whether the main motor 41 is being driven in step S5.

If the controller 61 determines that the main motor 41 is not being driven, i.e., if the controller 61 determines that the main motor 41 is being stopped (e.g., NO in step S5), the main motor 41 needs to be driven for executing the connection process or the disconnection process. Thus, the controller 61 determines whether the main motor 41 is allowed to be driven (e.g., step S6). The situation in which the main motor 41 is not allowed to be driven includes, for example, a situation in which an image forming request has not been issued (i.e., image formation onto a sheet is not scheduled) after warm-up of the image forming apparatus 11 performed in response to power-on of the image forming apparatus 11 was completed.

If the controller 61 determines that the main motor 41 is not allowed to be driven (e.g., NO in step S6), the controller 61 executes the connection necessity determination process again (e.g., step S3).

If the controller 61 determines that the main motor 41 is allowed to be driven (e.g., YES in step S6), the controller 41 causes the main motor 41 to be driven (e.g., step S7) and then executes the connection necessity determination process again (e.g., step S3).

If the controller 61 determines that the main motor 41 is being driven (e.g., YES in step S5), the controller 61 determines whether the value of the connection necessity variable is greater than the current value of the connection completed variable (e.g., step S8).

If the value of the connection necessity variable is greater than the current value of the connection completed variable (e.g., YES in S8), it means that there is one or more trays LT that need to undergo the connection process, but have not undergone the connection process yet. Thus, the controller 61 executes the connection process (e.g., step S9). Subsequent to the connection process (e.g., step S9), the controller 61 executes the connection necessity determination process again (e.g., step S3).

If the controller 61 determines that the value of the connection necessity variable is smaller than the current value of the connection completed variable (e.g., NO in step S8), it means that there is one or more add-on trays LT that need to undergo the disconnection process because of elimination of the need to retain the connectable member 85 of the driving force transmission mechanism 51 at the connected position. Thus, the controller 61 executes the disconnection process (e.g., step S10). Subsequent to the disconnection process (e.g., step S10), the controller 61 executes the connection necessity determination process again (e.g., step S3).

After repeating steps S3 to S10 appropriately for each situation, the controller 61 determines that the current value of the connection completed variable matches the value of the connection necessity variable (e.g., YES in step S4). Thereafter, the controller 61 repeats the connection necessity determination process (e.g., step S3) until the controller 61 determines that the value of the connection completed variable does not match the value of the connection necessity variable.

<State Determination Process>

Figure 9:
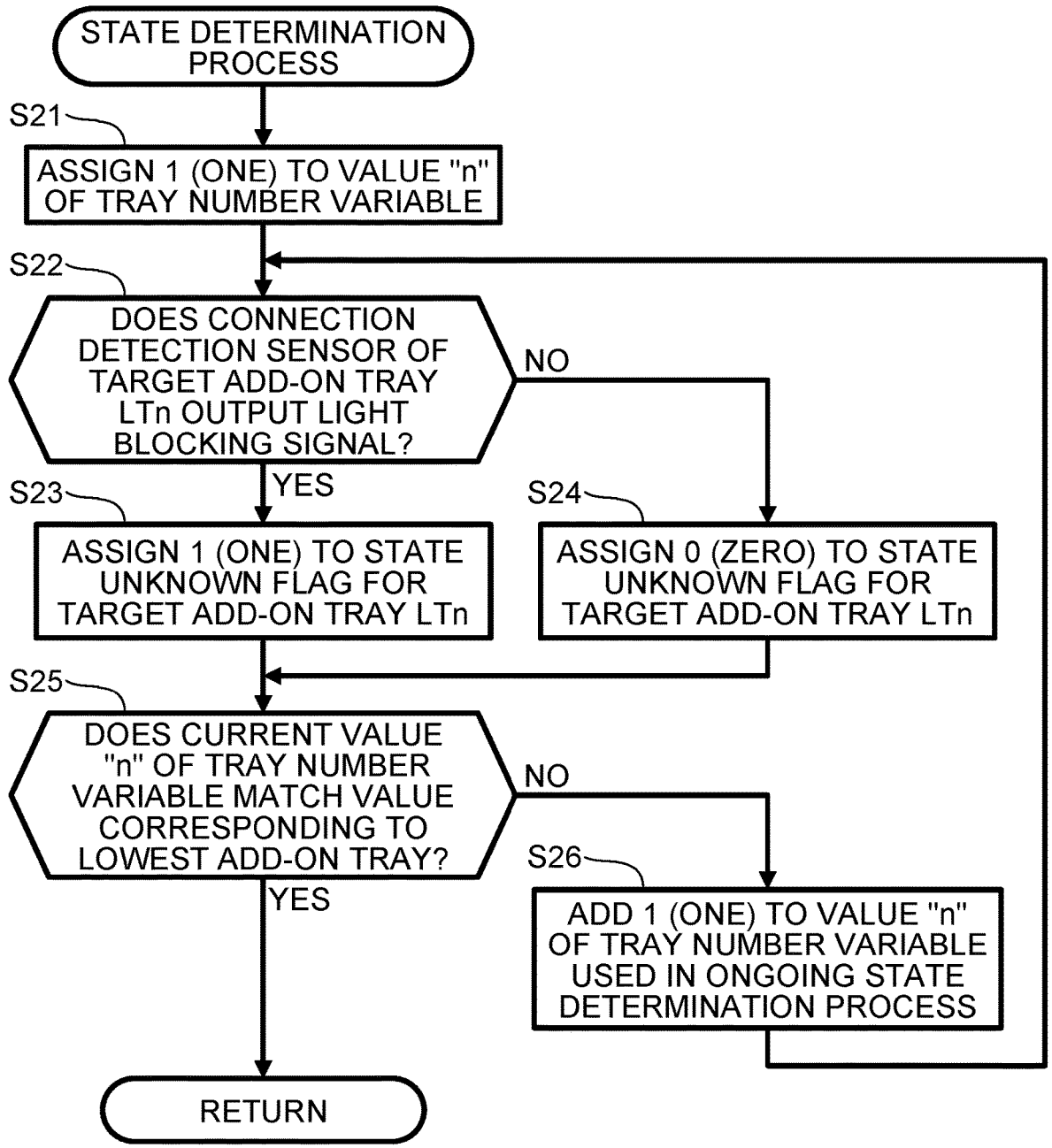
FIG. 9 is a flowchart of a state determination process in the illustrative embodiment according to one or more aspects of the disclosure.

FIG. 9 is a flowchart of the state determination process executed in step S2. As described above, the controller 61 executes the state determination process for determining, with respect to each of the one or more add-on trays LT, whether the target add-on tray LT is in the unknown state even if the controller 61 has detected a light blocking signal outputted from the connection detection sensor 102 of the target add-on tray LT. The unknown state means a state in which the connectable member 85 is not assured of being located at the connected position.

In the state determination process, the controller 61 assigns 1 (one) to the value "n" of the tray number variable to be used in the state determination process (e.g., step S21). The value "n" of the tray number variable indicates what number the target add-on tray LT whose state is to be determined by the controller 61 is from the first add-on tray LT1.

Subsequent to step S21, the controller 61 determines whether the connection detection sensor 102 of the target add-on tray LTn outputs a light blocking signal (e.g., step S22). In a case where the current value "n" of the tray number variable is assigned 1 (one), the controller 61 determines whether the connection detection sensor 102 of the first add-on tray LT1 outputs a light blocking signal.

If the controller 61 determines that the connection detection sensor 102 outputs a light blocking signal (e.g., YES in step S22), the controller 61 assigns 1 (one) to a state unknown flag for the target add-on tray LTn (e.g., step S23). The value 1 (one) indicates that the target add-on tray LTn is in the unknown state. For example, in a case where the current value "n" of the tray number variable is assigned 1 (one), the controller 61 assigns 1 (one) to the state unknown flag for the first add-on tray LT1.

If the controller 61 determines that the connection detection sensor 102 does not output a light blocking signal, i.e., if the controller 61 determines that the connection detection sensor 102 outputs a light receiving signal (e.g., NO in step S22), the controller 61 assigns 0 (zero) to the state unknown flag for the target add-on tray LTn (e.g., step S24). The value 0 (one) indicates that the connectable member 85 is assured of being located in the connected position. For example, in a case where the current value "n" of the tray number variable is assigned 1 (one), the controller 61 assigns 0 (zero) to the state unknown flag for the first add-on tray LT1.

Subsequent to step S23 (S22: YES) or step S24 (S22: NO), the controller 61 determines whether the value "n" of the tray number variable used in the ongoing state determination process matches the value corresponding to the lowest add-on tray LT (e.g., step S25). In this illustrative embodiment, the image forming apparatus 11 includes three add-on trays LT which may be the first add-on tray LT1 (e.g., the top add-on tray LT), the second add-on tray LT2, and the third add-on tray LT3 (e.g., the lowest add-on tray LT). Therefore, the controller 61 determines whether the value "n" of the tray number variable used in the ongoing state determination process is assigned 3.

If the controller 61 determines that the value "n" of the tray number variable used in the ongoing state determination process does not match the value corresponding to the lowest add-on tray LT (e.g., NO in step S25), the controller 61 adds 1 (one) to the value "n" of the tray number variable used in the ongoing state determination process (e.g., step S26). Subsequent to step S26, the controller 61 determines whether the connection detection sensor 102 of the next target add-on tray LTn identified by the value that is the sum of the value "n" of the tray number variable and 1 (one) outputs a light blocking signal (e.g., step S22). In a case where the value "n" of the tray number variable before 1 (one) is added (i.e., the previous value "n") indicates 1 (one), in step S22, the controller 61 determines whether the connection detection sensor 102 of the second add-on tray LT2 outputs a light blocking signal.

As described above, one of values of 1 (one) and 0 (zero) is assigned to the state unknown flag for each of the add-on trays LTn from the top (first) add-on tray LT1 to the lowest add-on tray LTn with respect to all of the one or more add-on trays LTn. In a case where the controller 61 determines that the value "n" of the tray number variable used in the ongoing state determination process matches the value corresponding to the lowest add-on tray LTn (e.g., YES in step S25) after assigning 1 (one) or 0 (zero) to the state unknown flag for the lowest add-on tray LTn, the controller 61 ends the state determination process and returns to the connection and disconnection switching process.

<Connection Necessity Determination Process>

Figure 10:
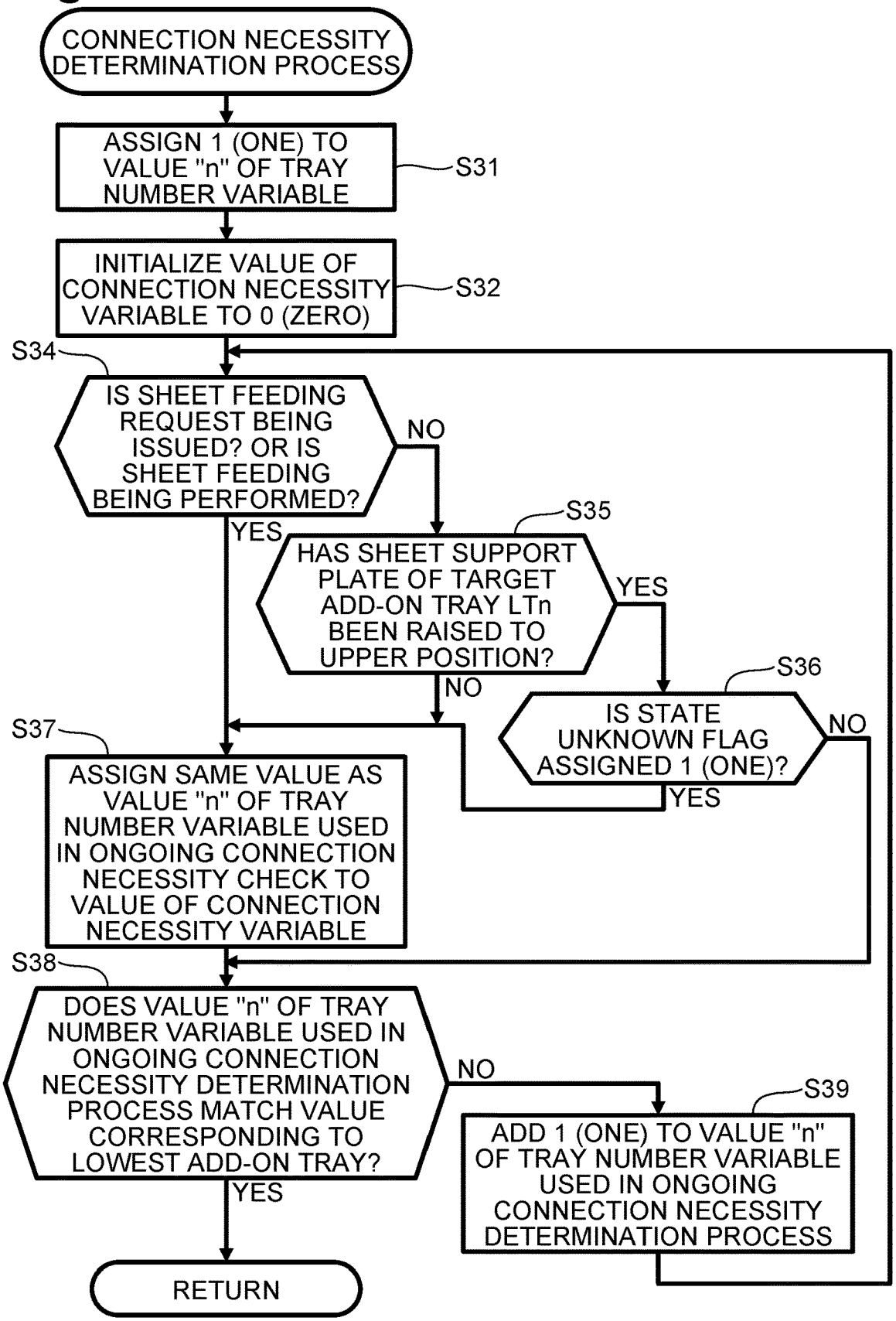
FIG. 10 is a flowchart of a connection necessity determination process in the illustrative embodiment according to one or more aspects of the disclosure.

FIG. 10 is a flowchart of the connection necessity determination process executed in step S3 of FIG. 8. As described above, the controller 61 determines, with respect to each of the one or more add-on trays LT, whether the connection process, in which the connectable member 85 of the driving force transmission mechanism 51 is moved to the connected position, needs to be executed and identifies the lowest add-on tray LT among one or more add-on trays LT whose connectable member 85 needs to be moved to the connected position.

In the connection necessity determination process, the controller 61 assigns 1 (one) to the value "n" of the tray number variable to determine the top (first) add-on tray LT1 as a target to be checked (e.g., step S31).

The controller 61 has not yet executed the connection necessity determination process with respect to any of the one or more add-on trays LT. Therefore, the controller 61 initializes the value of the connection necessity variable to 0 (zero) (e.g., step S32).

Subsequent to step S32, the controller 61 determines whether a request for feeding sheet from the target add-on tray LTn (a sheet feed request) is being issued or a sheet is being fed from the target add-on tray LTn (e.g., step S34).

If the controller 61 determines that a sheet feeding request is not being issued or sheet feeding is not being performed (e.g., NO in step S34), the controller 61 determines whether the sheet support plate 31, supporting one or more sheets in the target add-on tray LTn, has been raised to the upper position. That is, whether an upper surface of a topmost one of the one or more sheets supported by the sheet support plate 31 is in contact with the feed roller 32 while the sheet support plate 31 of the target add-on tray LTn is located at the upper position (e.g., step S35).

If the controller 61 determines that the sheet support plate 31 of the target add-on tray LTn has been raised to the upper position (e.g., YES in step S35), the controller 61 determines whether the state unknown flag for the target add-on tray LTn is assigned 1 (one) (e.g., step S36).

If the controller 61 determines that the state unknown flag for the target add-on tray LTn is assigned 1 (one) (e.g., YES in step S36), the target add-on tray LTn is in the unknown state. Therefore, the connectable member 85 of the driving force transmission mechanism 51 needs to be reliably moved to the connected position once to release the target add-on tray LTn from the unknown state. Thus, the controller 61 assigns the same value as the value "n" of the tray number variable used in the ongoing connection necessity determination process to the value of the connection necessity variable (e.g., step S37). If the controller 61 determines that a sheet feeding request is being issued or sheet feeding is being performed (e.g., YES in step S34) or if the controller 61 determines that the sheet support plate 31 of the target add-on tray LTn has not been raised to the upper position (e.g., NO in step S35), a driving force of the main motor 41 needs to be transmitted to at least one of the sheet support plate 31, the feed roller 32, and the conveying roller pair 33 of the target add-on tray LTn by moving the connectable member 85 of the driving force transmission mechanism 51 to the connected position. Thus, the controller 61 assigns the same value as the value "n" of the tray number variable used in the ongoing connection necessity determination process to the connection necessity variable (e.g., step S37).

Subsequent to step S37, the controller 61 determines whether the value "n" of the tray number variable used in the ongoing connection necessity determination process matches the value corresponding to the lowest add-on tray LT (e.g., step S38). In this illustrative embodiment, the image forming apparatus 11 includes three add-on trays LT which may be the first add-on tray LT1 (e.g., the top add-on tray LTn), the second add-on tray LT2, and the third add-on tray LT3 (e.g., the lowest add-on tray LTn). Therefore, the controller 61 determines whether the value "n" of the tray number variable used in the ongoing connection necessity process is assigned 3.

If the controller 61 determines that the state unknown flag for the target add-on tray LTn is not assigned 1 (one), i.e., the state unknown flag for the target add-on tray LTn is assigned 0 (zero) (e.g., NO in step S36), the connectable member 85 of the driving force transmission mechanism 51 of the target add-on tray LTn is assured of being located at the disconnected position and a driving force of the main motor 41 does not need to be transmitted to the sheet support plate 31, the feed roller 32, and the conveyor roller pair 33 of the target add-on tray LTn. Thus, the controller 61 skips step S37, i.e., the controller 61 does not assign the same value as the value "n" of the tray number variable used in the ongoing connection necessity check. In other words, subsequent to step S36, the controller 61 determines whether the value "n" of the tray number variable used in the ongoing connection necessity determination process matches the value corresponding to the lowest add-on tray LTn (e.g., step S38).

If the controller 61 determines that the value "n" of the tray number variable used in the ongoing connection necessity determination process does not match the value corresponding to the lowest add-on tray LTn (e.g., NO in step S38), it means that the one or more add-on trays LT that have not undergone the connection necessity determination process are present below the add-on tray LT that is the current target of the ongoing connection necessity determination process. Thus, the controller 61 adds 1 (one) to the value "n" of the tray number variable used in the ongoing connection necessity determination process (e.g., step S39).

As described above, the controller 61 determines, with respect to all of the one or more add-on trays LT, whether the connectable member 85 of the coupling 73 needs to be moved to the connected position, from the top (first) add-on tray LT1 to the lowest add-on tray LTn. As a result of the determination, the controller 61 assigns the value corresponding to the lowest add-on tray LT among the one or more add-on trays LT whose connectable member 85 needs to be moved to the connected position, to the value of the connection necessity variable stored in RAM.

<Connection Process>

Figure 11:
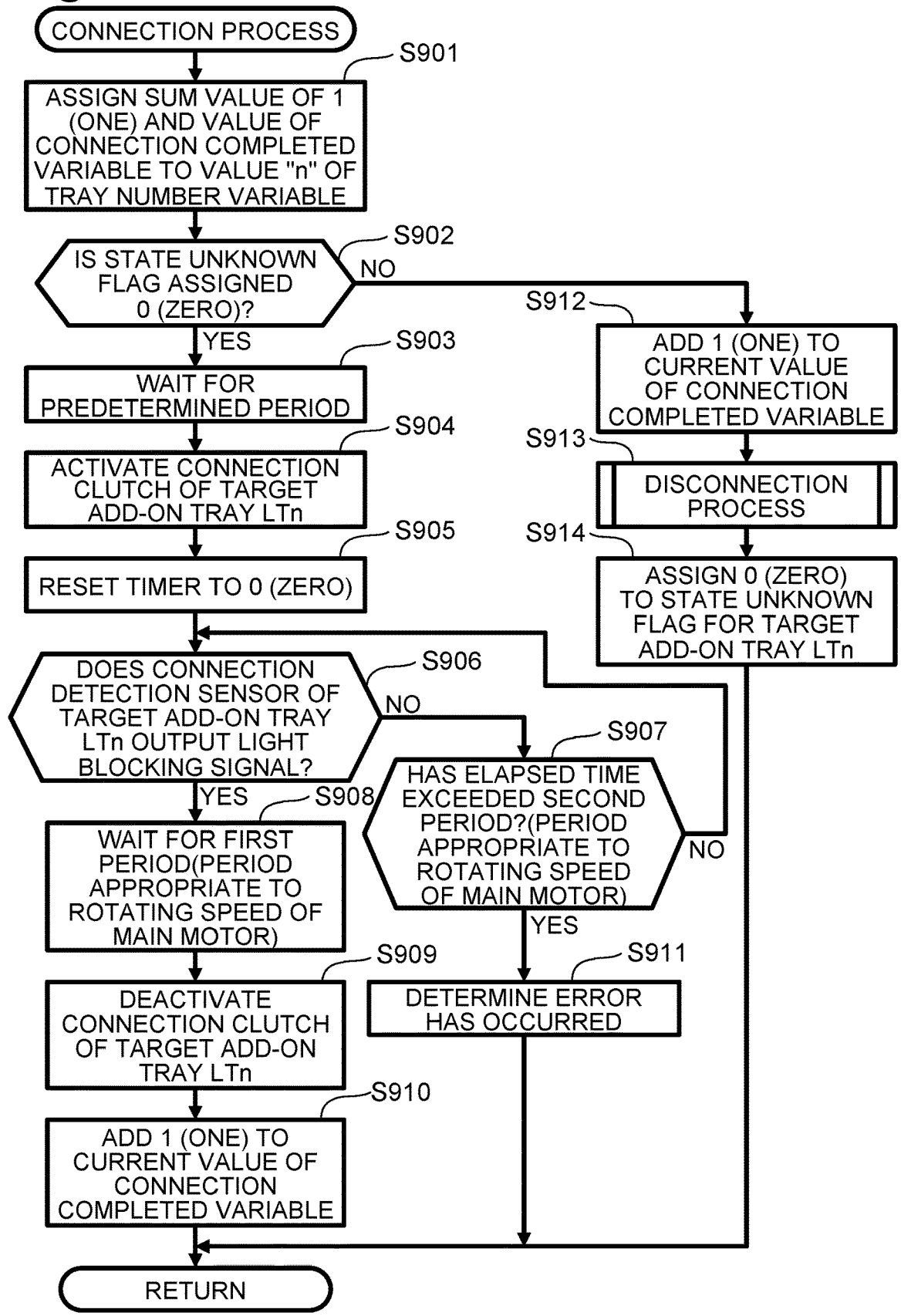
FIG. 11 is a flowchart of a connection process in the illustrative embodiment according to one or more aspects of the disclosure.

FIG. 11 is a flowchart of the connection process executed in step S9 of FIG. 8. The controller 61 activates the connection clutch 52 of each of the one or more add-on trays LT whose connectable member 85 needs to be moved to the connected position, to move the connection clutch 52 to the connected position in each of the one or more add-on trays LT. More specifically, the controller 61 activates the connection clutch 52 of each of the one or more add-on trays LT whose connectable member 85 needs to be moved to the connected position, to move the connectable member 85 to the connected position in an order from top to bottom, e.g., from the top (first) add-on tray LT1 to the add-on tray LT identified by the value of the connection necessity variable assigned in the connection necessity determination process. With the activation of the connection clutch 52, the controller 61 causes the connectable member 85 to move to the connected position in each of the one or more add-on trays LT.

In one example, as illustrated in FIG. 1, the image forming apparatus 11 includes three add-on trays LT, e.g., the top (first) add-on tray LT1, the second add-on tray LT2, and the lowest (third) add-on tray LT3. In a case where the controller 61 determines, based on the result of the connection necessity determination process of FIG. 10, that only the first add-on tray LT1 needs to undergo the connection process and the second and third add-on trays LT2 and LT3 do not need to undergo the connection process, the controller 61 assigns 1 (one) to the value of the connection necessity variable. Thus, the controller 61 executes the connection process for the first add-on tray LT1 only.

In another example, in a case where the controller 61 determines, based on the result of the connection necessity determination process of FIG. 10, that the add-on trays LT1 and LT3 need to undergo the connection process and only the add-on tray LT2 does not need to undergo the connection process, the controller 61 assigns 3 to the value of the connection necessity variable although the controller 61 has determined that the second add-on tray LT2 does not need to undergo the connection process. Thus, the controller 61 executes the connection process for all of the first, second, and third add-on trays LT1, LT2, and LT3. This is because the controller 61 determines that the third add-on tray LT3 located below the second add-on tray LT2 needs to undergo the connection process and thus a driving force of the main motor 41 needs to be transmitted to the input gear 71 of the driving force transmission mechanism 51 of the third add-on tray LT3 although the second add-on tray LT2 does not need to undergo any process for resolving the unknown state or for transmitting a driving force of the main motor 41 to the sheet supply plate 31, the feed roller 32, and the conveying roller pair 33 of the second add-on tray LT2.

In the connection process, the controller 61 assigns a value, which is a sum of 1 (one) and the current value of the connection completed variable, to the value "n" of the tray number variable to be used in the connection process (e.g., step S901). When the controller 61 executes the connection process a first time after the power of the image forming apparatus 11 is turned on or after the image forming apparatus 11 has just recovered from an error which interrupts image formation, the value of the connection completed variable is assigned 0 (zero). Therefore, the controller 61 assigns 1 (one) to the value of the connection completed variable. That is, the controller 61 determines the top (first) add-on tray LT1 as a target of the connection process.

Subsequent to step S902, the controller 61 determines whether the state unknown flag for the target add-on tray LTn is assigned 0 (zero) (e.g., step S902).

If the controller 61 determines that the state unknown flag for the target add-on tray LTn is assigned 0 (one) (e.g., YES in step S902), the controller 61 waits for a predetermined period (e.g., step S903).

Upon lapse of the predetermined period, the controller 61 activates the connection clutch 52 of the target add-on tray LTn (e.g., ON) (e.g., step S904). The timing at which the controller 61 activates the connection clutch 52 of the target add-on tray LTn corresponds to timing T1 of FIG. 7. In response to the activation of the connection clutch 52 at timing T1, the cam 74 of the driving force transmission mechanism 51 starts rotating counterclockwise in FIG. 6 from a state where the light-blocking wall 101 unblocks sensor light of the connection detection sensor 102, i.e., from a state where the cam 74 causes the connection detection sensor 102 to output a light receiving signal. As illustrated in FIG. 6, a first range including the contactable surface 96 and the second inclined surface 97 has a first end, which corresponds to the boundary between the first inclined surface 95 and the contactable surface 96 of the cam 74, and a second end, which corresponds to the boundary between the second inclined surface 97 and the noncontact surface 98. That is, in response to the activation of the connection clutch 52 at timing T1, the cam 74 starts rotating counterclockwise in FIG. 6 from a state where a portion of the cam 74 between the first end and the second end within the first range faces the flange portion 90.

Subsequent to step S904, the controller 61 resets a timer to 0 (zero) (e.g., step S905) and then starts the timer to measure a time elapsed from the activation of the connection clutch 52 of the target add-on tray LTn.

Subsequent to activating the connection clutch 52, the controller 61 determines whether the connection detection sensor 102 of the target add-on tray LTn outputs a light blocking signal (e.g., step S906). In a case where the value "n" of the tray number variable is assigned 1 (one), the controller 61 determines whether the connection detection sensor 102 of the first add-on tray LT1 outputs a light blocking signal.

If the controller 61 determines that the connection detection sensor 102 does not output a light blocking signal, i.e., if the controller 61 determines that the connection detection sensor 102 outputs a light receiving signal (e.g., NO in step S906), the controller 61 determines whether the elapsed time being measured by the timer has exceeded a second period (e.g., step S907). The second period may be longer than the time required for the cam 74 of the driving force transmission mechanism 51 to rotate counterclockwise in FIG. 6 from a timing at which the boundary between the first inclined surface 95 and the contactable surface 96 of the cam 74 faces the flange portion 90 of the connectable member 85 (refer to FIG. 6) to a timing at which the boundary between the second inclined surface 97 and the noncontact surface 98 faces the flange portion 90 of the connectable member 85, i.e., to a timing at which the detection signal outputted from the connection sensor 102 is changed from a light receiving signal to a light blocking signal in response to blocking of the sensor light of the connection detection sensor 102 by the light-blocking wall 101.

The time required for the cam 74 to rotate from the timing at which one particular portion of the cam 74 faces the flange portion 90 to the timing at which another particular portion of the cam 74 faces the flange portion 90 varies inevitably in accordance with the rotating speed of the main motor 41. Therefore, the second period is specified as a period having a duration associated with the rotating speed of the main motor 41. The image forming apparatus 11 has a plurality of operation modes, for example, a normal mode, a silent mode, and a thick sheet mode. In the normal mode, the image forming apparatus 11 forms an image onto a sheet at a normal image forming speed (i.e., a sheet conveying speed). In the silent mode, the image forming apparatus 11 forms an image onto a sheet at a slower image forming speed than the normal image forming speed. In the thick sheet mode, a heating temperature for fixing an image onto a sheet is higher than a heating temperature in the normal mode and a heating temperature in the silent mode, and the image forming apparatus 11 forms an image onto a sheet at the same image forming speed as the image forming speed in the silent mode. In each of the silent mode and the thick sheet mode, the rotating speed of the main motor 41 is slower than that in the normal mode. Therefore, the second period for each of the silent mode and the thick sheet mode is specified as being longer than the second period for the normal mode.

If the controller 61 determines that the time being measured by the timer has not exceeded the second period (e.g., NO in step S907), the controller 61 determines again whether the connection detection sensor 102 of the target add-on tray LTn outputs a light blocking signal (e.g., step S906). In a case where the controller 61 determines that the time being measured by the timer has not exceeded the second period, it means that the boundary between the second inclined surface 97 and the noncontact surface 98 has not reached the flange portion 90 and thus the cam 74 needs to be further rotated counterclockwise.

If the controller 61 determines that the detection signal outputted from the connection detection sensor 102 of the target add-on tray LTn has been changed from a light receiving signal to a light blocking signal before the elapsed time being measured by the timer exceeds the second period (e.g., YES in step S906), the controller 61 waits for the first period (e.g., step S908). The timing at which the controller 61 determines that the detection signal outputted from the connection detection sensor 102 of the target add-on tray LTn has been changed from a light receiving signal to a light blocking signal corresponds to timing T2 of FIG. 7. At timing T2, the cam 74 of the driving force transmission mechanism 51 is in a state where the boundary between the second inclined surface 97 and the noncontact surface 98 faces the flange portion 90. In other words, the cam 74 is in a state where the cam 74 just starts blocking the sensor light of the connection detection sensor 102 by the light-blocking wall 101 to cause the connection detection sensor 102 to change its outputting detection signal from a light receiving signal to a light blocking signal. When the boundary between the second inclined surface 97 and the noncontact surface 98 of the cam 74 faces the flange portion 90, the position of the connectable member 85 is changed from the disconnected position to the connected position. If, therefore, the connection clutch 52 becomes deactivated when the boundary between the second inclined surface 97 and the noncontact surface 98 faces the flange portion 90, the connectable member 85 is not assured of being located at the connected position. Thus, in some cases, a driving force of the main motor 41 might not be reliably transmitted to the target components, e.g., the sheet support plate 31, from the driving force transmission mechanism 51. Thus, the controller 61 waits for the first period even if the controller 61 has determined that the detection signal outputted from the connection detection sensor 102 was changed from a light receiving signal to a light blocking signal (e.g., YES in step S906). The first period is specified as the time required time required for the cam 74 of the driving force transmission mechanism 51 to rotate counterclockwise in FIG. 4 from a timing at which the boundary between the second inclined surface 97 and the noncontact surface 98 faces the flange portion 90 to a timing at which the position of the connectable member 85 is changed to the connected position reliably. The first period is specified also as being shorter than the time required for the cam 74 of the driving force transmission mechanism 51 to rotate counterclockwise in FIG. 4 from a timing at which the boundary between the second inclined surface 97 and the noncontact surface 98 faces the flange portion 90 to a timing at which the boundary between the noncontact surface 98 and the cut portion 94 faces the flange portion 90.

The time required for the cam 74 to rotate from the timing at which one particular portion of the cam 74 faces the flange portion 90 to the timing at which another particular portion of the cam 74 faces the flange portion 90 varies inevitably in accordance with the rotating speed of the main motor 41. Therefore, the first period is specified as a period having a duration associated with the rotating speed of the main motor 41. In each of the silent mode and the thick sheet mode, the rotating speed of the main motor 41 is slower than that in the normal mode. Therefore, the first period for each of the silent mode and the thick sheet mode is specified as being longer than the first period for the normal mode.

Upon lapse of the first period from the timing at which the detection signal outputted from the connection detection sensor 102 was changed from the light receiving signal to the light blocking signal, the controller 61 deactivates the connection clutch 52 of the target add-on tray LTn (e.g., OFF) (e.g., step S909). The timing at which the controller 61 deactivates the connection clutch 52 of the target add-on tray LTn corresponds to timing T3 of FIG. 7. The deactivation of the connection clutch 52 at timing T3 may enable the cam 74 to stop rotating in the state where the connectable member 85 is assured of being located at the connected position.

Since the connectable member 85 of the driving force transmission mechanism 51 of the target add-on tray LTn has been moved to the connected position from the disconnected position reliably, subsequent to step S909, the controller 61 adds 1 (one) to the current value of the connection completed variable (e.g., step S910) and ends the connection process.

If the controller 61 determines that the elapsed time being measured by the timer has exceeded the second period (e.g., YES in step S907) after determining that the detection signal outputted from the connection detection sensor 102 of the target add-on tray LTn has not been changed from a light receiving signal to a light blocking signal (e.g., NO in step S906), the detection signal outputted from the connection detection sensor 102 has not been changed from a light receiving signal to a light blocking signal although the elapsed time being measured has exceeded an intended changing timing. Thus, the controller 61 determines that some error has occurred (e.g., step S911). The error may be, for example, a breakage of the connection clutch 52, a breakage of the connection detection sensor 102, or a rotation failure in the gear train for transmitting a driving force to the cam drive gear 92. In such a case, the controller 61 stops all the motors including the main motor 41 of the image forming apparatus 11 to deactivate the sheet feed clutches 42 and 53 and the connection clutches 52 to end the connection process. In a case where such an error has occurred, for example, the controller 61 may provide notification of the error using an indication lamp.

If the controller 61 determines that the state unknown flag for the target add-on tray LTn is not assigned 0 (zero), i.e., the state unknown flag is assigned 1 (one) (e.g., NO in step S902), the controller 61 adds 1 (one) to the current value of the connection completed variable (e.g., step S912). In the disconnection process, usually, an add-on tray LT that has undergone the connection process is assigned as a target of the disconnection process. Nevertheless, the addition of 1 (one) to the current value of the connection completed variable by the controller 61 enables an add-on tray LT that is in the unknown state to be assigned also as a target of the disconnection process.

Subsequent to S912, in order to resolve the unknown state of the target add-on tray LTn, the controller 61 executes the disconnection process before proceeding to subsequent steps of the connection process (e.g., step S913).

With the execution of the disconnection process, the connectable member 85 of the target add-on tray LTn has been moved to the disconnected position reliably to resolve the unknown state of the target add-on tray LTn. Therefore, subsequent to step S913, the controller 61 assigns 0 (zero) to the state unknown flag for the target add-on tray LTn (e.g., step S914) and ends the connection process.

<Disconnection Process>

Figure 12:
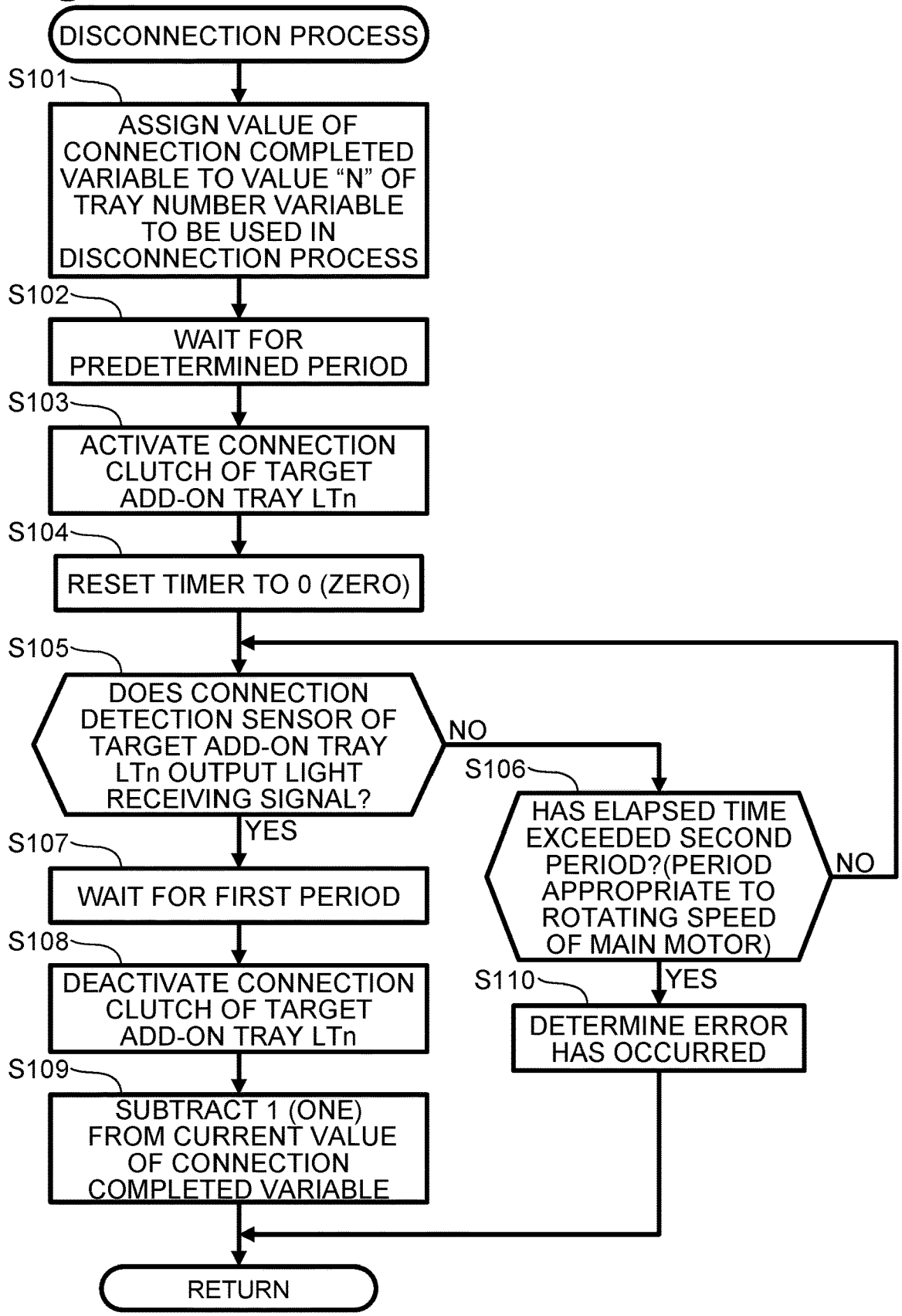
FIG. 12 is a flowchart of a disconnection process in the illustrative embodiment according to one or more aspects of the disclosure.

FIG. 12 is a flowchart of the disconnection process executed in step S10 of FIG. 8 and in step S913 of FIG. 11. The controller 61 activates the connection clutch 52 of each of the one or more target add-on trays LT whose connectable member 85 needs to be moved to the disconnected position, to move the connection clutch 52 to the disconnected position. The controller 61 executes the disconnection process in an order from below to top, e.g., from a target add-on tray LT corresponding to the value of the connection completed variable to the top add-on tray LT.

In the connection process, the controller 61 assigns the value of the connection completed variable to the value "n" of the tray number variable to be used in the disconnection process (e.g., step S101). More specifically, in the disconnection process (e.g., step S10) of the connection and disconnection switching process of FIG. 8, the controller 61 assigns, as a target of the disconnection process (e.g., step S10), the lowermost add-on tray LT whose connectable member 85 of the driving force transmission mechanism 51 among the one or more add-on trays LT that have undergone the connection process. On the other hand, in the disconnection process (e.g., step S913) of the connection process of FIG. 11, the controller 61 assigns, as a target of the disconnection process (e.g., step S913), an add-on tray LT that has been assigned as a target of the connection process in order to resolve the unknown state of the add-on tray LT and that becomes required to have undergone the disconnection process before proceeding to the particular steps of the connection process.

Subsequent to step S101, the controller 61 waits for a predetermined period (e.g., step S102).

Upon lapse of the predetermined period, the controller 61 activates the connection clutch 52 of the target add-on tray LTn (e.g. ON) (e.g., step S103). The timing at which the controller 61 activates the connection clutch 52 of the target add-on tray LTn corresponds to timing T4 of FIG. 7. In response to the activation of the connection clutch 52 at timing T4, the cam 74 of the driving force transmission mechanism 51 starts rotating counterclockwise in FIG. 4 from a state where the light-blocking wall 101 blocks sensor light of the connection detection sensor 102, i.e., from a state where the cam 74 causes the connection detection sensor 102 to output a light blocking signal. As illustrated in FIG. 4, a second range including the noncontact surface 98, the cut portion 94, and the first inclined surface 95 has the first end, which corresponds to the boundary between the first inclined surface 95 and the contactable surface 96 of the cam 74, and the second end, which corresponds to the boundary between the second inclined surface 97 and the noncontact surface 98. That is, in response to the activation of the connection clutch 52 at timing T4, the cam 74 starts rotating counterclockwise in FIG. 4 from a state where a portion of the cam 74 between the first end and the second end within the second range faces the flange portion 90.

Subsequent to step S103, the controller 61 resets the timer to 0 (zero) (e.g., step S104) and then starts the timer to measure a time elapsed from the activation of the connection clutch 52.

Subsequent to activating the connection clutch 52, the controller 61 determines whether the connection detection sensor 102 of the target add-on tray LTn outputs a light receiving signal (e.g., step S105). In a case where the value "n" of the tray number variable is assigned 1 (one), the controller 61 determines whether the connection detection sensor 102 of the first add-on tray LT1 outputs a light receiving signal.

If the controller 61 determines that the connection detection sensor 102 does not output a light receiving signal, i.e., if the controller 61 determines that the connection detection sensor 102 outputs a light blocking signal (e.g., NO in step S105), the controller 61 determines whether the elapsed time being measured by the timer has exceeded the second period (e.g., step S106). The second period may be longer than the time required for the cam 74 of the driving force transmission mechanism 51 to rotate counterclockwise in FIG. 6 from a timing at which the boundary between the second inclined surface 97 and the noncontact surface 98 of the cam 74 faces the flange portion 90 of the connectable member 85 to a timing at which the boundary between the first inclined surface 95 and the contactable surface 96 faces the flange portion 90 of the connectable member 85, i.e., to a timing at which the detection signal outputted from the connection sensor 102 is changed from a light blocking signal to a light receiving signal in response to unblocking of the sensor light of the connection detection sensor 102 by the light-blocking wall 101.

The time required for the cam 74 to rotate from the timing at which one particular portion of the cam 74 faces the flange portion 90 to the timing at which another particular portion of the cam 74 faces the flange portion 90 varies inevitably in accordance with the rotating speed of the main motor 41. Therefore, the second period is specified as a period having a duration associated with the rotating speed of the main motor 41. In each of the silent mode and the thick sheet mode, the rotating speed of the main motor 41 is slower than that in the normal mode. Therefore, the second period for each of the silent mode and the thick sheet mode is specified as being longer than the second period for the normal mode.

In the illustrative embodiment, the duration of the second period to be used as a reference in the determination at S907 in the connection process of FIG. 11 is equal to the duration of the second period to be used as a reference in the determination at S106 in the disconnection process of FIG. 12. Nevertheless, in other embodiments, for example, the duration of the second period at S907 may be different from (e.g., longer than or shorter than) the duration of the second period at S106.

If the controller 61 determines that the time being measured by the timer has not exceeded the second period (e.g., NO in step S106), the controller 61 determines again whether the connection detection sensor 102 of the target add-on tray LTn outputs a light receiving signal (e.g., step S105). In a case where the controller 61 determines that the time being measured by the timer has not exceeded the second period, it means that the boundary between the first inclined surface 95 and the contactable surface 96 has not reached the flange portion 90 and thus the cam 74 needs to be further rotated counterclockwise.

If the controller 61 determines that the detection signal outputted from the connection detection sensor 102 of the target add-on tray LTn has been changed from a light blocking signal to a light receiving signal before the elapsed time being measured by the timer exceeds the first period (e.g., YES in step S105), the controller 61 waits for the first period (e.g., step S107). The timing at which the controller 61 determines that the detection signal outputted from the connection detection sensor 102 of the target add-on tray LTn has been changed from a light blocking signal to a light receiving signal corresponds to timing T5 of FIG. 7. At timing T5, the cam 74 of the driving force transmission mechanism 51 is in a state where the boundary between the second inclined surface 95 and the noncontact surface 96 faces the flange portion 90. In other words, the cam 74 is in a state where the cam 74 just starts unblocking the sensor light of the connection detection sensor 102 by the light-blocking wall 101 to cause the connection detection sensor 102 to change its outputting detection signal from a light blocking signal to a light receiving signal. Thus, the controller 61 waits for the first period even if the controller 61 determines that the detection signal outputted from the connection detection sensor 102 has changed from a light blocking signal to a light receiving signal (e.g., YES in step S105). The first period is specified as the time required for the cam 74 of the driving force transmission mechanism 51 to rotate counterclockwise in FIG. 6 from a timing at which the boundary between the first inclined surface 95 and the contactable surface 96 faces the flange portion 90 to a timing at which the connectable surface 96 faces the flange portion 90 reliably. The first period is specified also as being shorter than the time required for the cam 74 of the driving force transmission mechanism 51 to rotate counterclockwise in FIG. 6 from a timing at which the boundary between the first inclined surface 95 and the contactable surface 96 faces the flange portion 90 to a timing at which the boundary between the contactable surface 96 and the second inclined surface 97 faces the flange portion 90.

The time required for the cam 74 to rotate from the timing at which one particular portion of the cam 74 faces the flange portion 90 to the timing at which another particular portion of the cam 74 faces the flange portion 90 varies inevitably in accordance with the rotating speed of the main motor 41. Therefore, the first period is specified as a period having a duration associated with the rotating speed of the main motor 41. In each of the silent mode and the thick sheet mode, the rotating speed of the main motor 41 is slower than that in the normal mode. Therefore, the first period for each of the silent mode and the thick sheet mode is specified as being longer than the first period for the normal mode.

Upon lapse of the first period from the timing at which the detection signal outputted by the connection detection sensor 102 was changed from the light blocking signal to the light receiving signal, the controller 61 deactivates the connection clutch 52 of the target add-on tray LTn (e.g., OFF) (e.g., step S108). The timing at which the controller 61 deactivates the connection clutch 52 of the target add-on tray LTn corresponds to timing T6 of FIG. 7. With the deactivation of the connection clutch 52 at timing T6, when the connectable member 85 of the driving force transmission mechanism 51 of the target add-on tray LTn is moved to the disconnected position from the connected position after sheet feeding from the target add-on tray LTn is finished or when the connectable member 85 of the target add-on tray LT that is in the unknown state is moved to the disconnected position, the cam 74 is enabled to be stopped rotating in the state where the connectable member 85 is assured of being located at the disconnected position.

Since the connectable member 85 of the driving force transmission mechanism 51 of the target add-on tray LTn has been moved to the disconnected position from the connected position reliably, subsequent to step S108, the controller 61 subtracts 1 (one) from the current value of the connection completed variable (e.g., step S109) and ends the disconnection process.

If the controller 61 determines that the elapsed time being measured by the timer has exceeded the second period (e.g., YES in step S106) after determining that the detection signal outputted by the connection detection sensor 102 of the add-on tray LTn has not been changed from a light blocking signal to a light receiving signal (e.g., NO in step S105), the detection signal outputted from the connection detection sensor 102 has not been changed from a light blocking signal to a light receiving signal although the elapsed time being measured has exceeded an intended changing timing. Thus, the controller 61 determines that some error has occurred (e.g., step S110). In such a case, the controller 61 stops all the motors including the main motor 41 of the image forming apparatus 11 to deactivate the sheet feed clutches 42 and 53 and the connection clutches 52 to end the disconnection process.

<One Example of how Image Forming Apparatus Behaves in Connection and Disconnection Switching Process>

Figure 13:
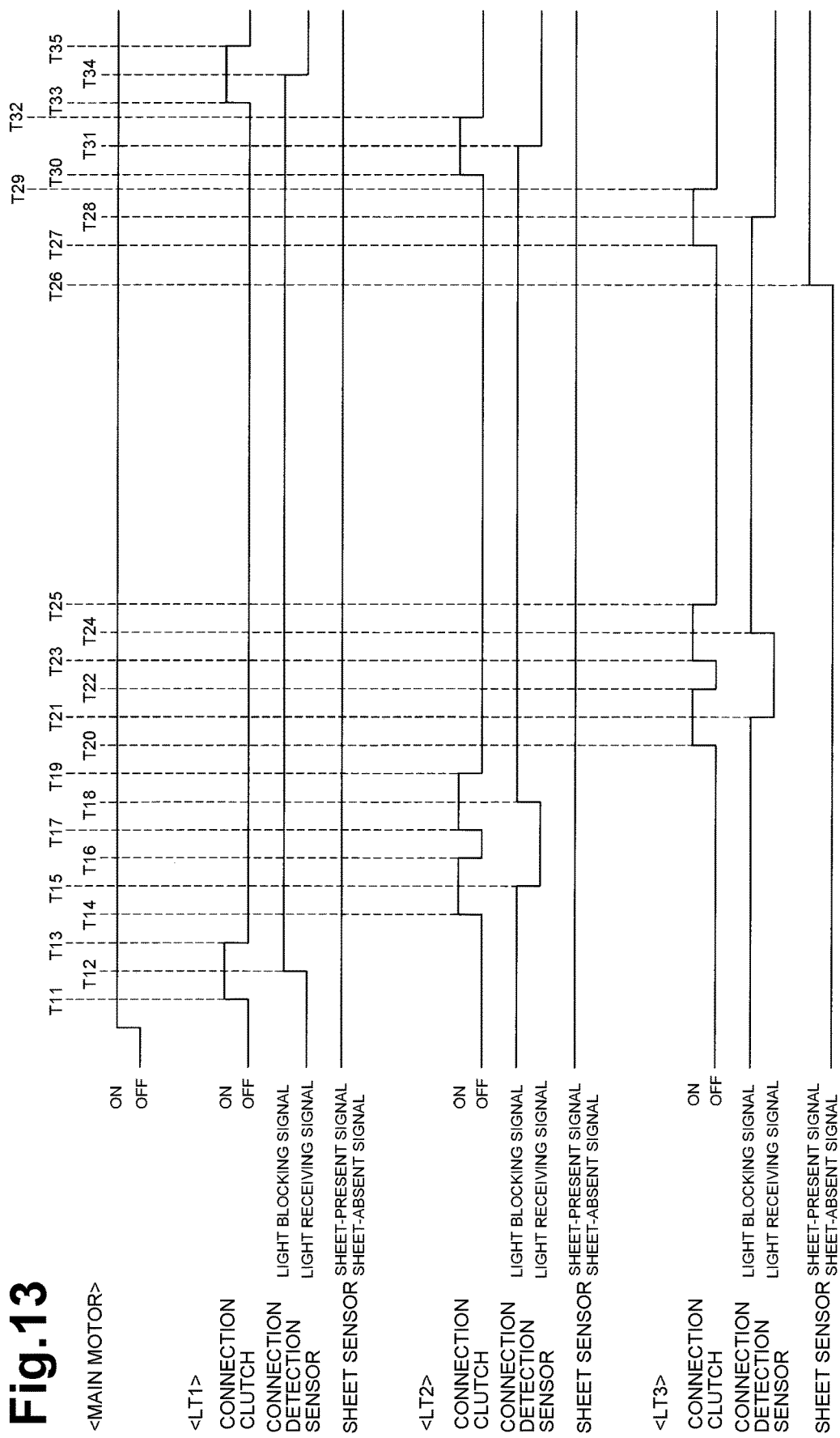
FIG. 13 is a timing diagram illustrating one example of how the image forming apparatus behaves in the connection and disconnection switching process in the illustrative embodiment according to one or more aspects of the disclosure.

FIG. 13 shows a timing diagram illustrating one example of how the image forming apparatus 11 behaves in the connection and disconnection switching process. The situation is assumed to be such that, when the power of the image forming apparatus 11 is turned on or when an error recovery request is issued, the controller 61 determines that both of the second and third add-on trays LT2 and LT3 are in the unknown state because the connection detection sensor 102 in each of the second and third add-on trays LT2 and LT3 outputs a light blocking signal, and that the sheet support plate 31 of the third add-on tray LT3 has not been raised to the upper position.

In response to activation (e.g., ON) of the main motor 41, the connection clutch 52 of the first add-on tray LT1 becomes activated (e.g., ON) in order to transmit a driving force of the main motor 41 to each of the second and third add-on trays LT2 and LT3 (e.g., timing T11).

In response to the activation of the connection clutch 52, the cam 74 of the driving force transmission mechanism 51 of the first add-on tray LT1 starts rotating. In accordance with the rotation of the cam 74, the connectable member 85 of the coupling 73 of the driving force transmission mechanism 51 moves from the disconnected position toward the connected position and the detection signal outputted by the connection detection sensor 102 is changed from a light receiving signal to a light blocking signal (e.g., timing T12).

Upon lapse of the first period from the timing at which the detection signal outputted from the connection detection sensor 102 was changed from the light receiving signal to the light blocking signal, the connection clutch 52 of the first add-on tray LT1 becomes deactivated (e.g., OFF) (e.g., timing T13). In response, the cam 74 stops rotating and the connectable member 85 is retained at the connected position. Thus, the driving force transmission mechanism 51 of the first add-on tray LT1 is maintained in the driving force transmitting state.

Thereafter, the connection clutch 52 of the second add-on tray LT2 becomes activated (e.g., ON) in order to transmit a driving force of the main motor 41 to the third add-on tray LT3 (e.g., timing T14). In response, the cam 74 of the driving force transmission mechanism 51 of the second add-on tray LT2 starts rotating and the connectable member 85 of the coupling 73 of the driving force transmission mechanism 51 moves toward the disconnected position.

In accordance with the rotation of the cam 74, the detection signal outputted by the connection detection sensor 102 is changed from the light blocking signal to the light receiving signal (e.g., timing T15). Upon lapse of the first period from the signal change, the connection clutch 52 of the second add-on tray LT2 becomes deactivated (e.g., OFF) (e.g., timing T16). In response, the cam 74 stops rotating and the connectable member 85 is retained at the disconnected position. Thus, the unknown state of the second add-on tray LT2 is resolved.

Thereafter, the connection clutch 52 of the second add-on tray LT2 becomes activated (e.g., ON) again (e.g., timing T17). In response, the cam 74 of the second add-on tray LT2 starts rotating and the connectable member 85 of the coupling 73 moves from the disconnected position toward the connected position.

In accordance with the rotation of the cam 74, the detection signal outputted by the connection detection sensor 102 is changed from the light receiving signal to the light blocking signal (e.g., timing T18). Upon lapse of the first period from the signal change, the connection clutch 52 of the second add-on tray LT2 becomes deactivated (e.g., OFF) (e.g., timing T19). In response, the cam 74 stops rotating, and similar to the connectable member 85 of the first add-on tray LT1, the connectable member 85 of the second add-on tray LT2 is retained at the connected position. Thus, the driving force transmission mechanism 51 of the second add-on tray LT2 is maintained in the driving force transmitting state.

Thereafter, the connection clutch 52 of the third add-on tray LT3 becomes activated (e.g. ON) (e.g., timing T20). In response, the cam 74 of the driving force transmission mechanism 51 of the third add-on tray LT3 starts rotating and the connectable member 85 of the coupling 73 of the driving force transmission mechanism 51 moves toward the disconnected position.

In accordance with the rotation of the cam 74, the detection signal outputted by the connection detection sensor 102 is changed from the light blocking signal to the light receiving signal (e.g., timing T21). Upon lapse of the first period from the signal change, the connection clutch 52 of the third add-on tray LT3 becomes deactivated (e.g., OFF) (e.g., timing T22). In response, the cam 74 stops rotating and the connectable member 85 is retained at the disconnected position. Thus, the unknown state of the second add-on tray LT3 is resolved.

Thereafter, for moving the sheet support plate 31 of the third add-on tray LT3 from the lower position to the upper position, the connection clutch 52 becomes activated (e.g., ON) again (e.g., timing T23). In response, the cam 74 of the third add-on tray LT3 starts rotating and the connectable member 85 of the coupling 73 moves from the disconnected position to the connected position.

In accordance with the rotation of the cam 74, the detection signal outputted by the connection detection sensor 102 is changed from the light receiving signal to the light blocking signal (e.g., timing T24). Upon lapse of the first period from the signal change, the connection clutch 52 of the third add-on tray LT3 becomes deactivated (e.g., OFF) (e.g., timing T25). In response, the cam 74 stops rotating, and similar to the connectable member 85 of each of the first and second add-on trays LT1 and LT2, the connectable member 85 of the third add-on tray LT3 is retained at the connected position. Thus, a driving force inputted to the input gear 71 of the driving force transmission mechanism 51 of the third add-on tray LT3 from the output gear 72 of the driving force transmission mechanism 51 of the second add-on tray LT2 is further transmitted to a sheet support plate moving mechanism to move the sheet support plate 31 of the third add-on tray LT3 from the lower position to the upper position.

In response to reaching of the sheet support plate 31 of the third add-on tray LT3 at the upper position, the detection signal outputted by the sheet sensor 63 is changed from one signal having a level outputted when no sheet contacts the feed roller 32 (e.g., a signal indicating the absence of a sheet, which is referred to as a sheet-absent signal) to another signal having another level outputted when an upper surface of a topmost one of one or more sheets supported by the sheet support plate 31 contacts the feed roller 32 (e.g., a signal indicating the presence of a sheet, which is referred to as a sheet-present signal) (e.g., timing T26). That is, it becomes unnecessary to retain the connectable member 85 of each of the first, second, and third add-on trays LT1, LT2, and LT3 at the connected position. Thus, upon lapse of a predetermined period from the signal change, the connection clutch 52 of the third add-on tray LT3 becomes activated (e.g., ON) (e.g., timing T27).

In response, the cam 74 of the third add-on tray LT3 starts rotating. In accordance with the rotation of the cam 74, the connectable member 85 of the coupling 73 moves from the connected position toward the disconnected position and the detection signal outputted by the connection detection sensor 102 is changed from a light blocking signal to a light receiving signal (e.g., timing T28).

Upon lapse of the first period from the timing at which the detection signal outputted from the connection detection sensor 102 was changed from the light blocking signal to the light receiving signal, the connection clutch 52 of the third add-on tray LT3 becomes deactivated (e.g., OFF) (e.g., timing T29). In response, the cam 74 stops rotating and the connectable member 85 is retained at the disconnected position. Thus, the driving force transmission mechanism 51 of the third add-on tray LT3 is maintained in the driving force blocking state.

Thereafter, the connection clutch 52 of the second add-on tray LT2 becomes activated (e.g., ON) (e.g., timing T30). In response, the cam 74 of the second add-on tray LT2 starts rotating. In accordance with the rotation of the cam 74, the connectable member 85 of the coupling 73 moves from the connected position toward the disconnected position and the detection signal outputted by the connection detection sensor 102 is changed from the light blocking signal to the light receiving signal (e.g., timing T31).

Upon lapse of the first period from the timing at which the detection signal outputted by the connection detection sensor 102 was changed from the light blocking signal to the light receiving signal, the connection clutch 52 of the second add-on tray LT2 becomes deactivated (e.g., OFF) (e.g., timing T32). In response, the cam 74 stops rotating, and similar to the connectable member 85 of the third add-on tray LT3, the connectable member 85 of the second add-on tray LT2 is also retained at the connected position. Thus, the driving force transmission mechanism 51 of the second add-on tray LT2 is maintained in the driving force blocking state.

Thereafter, the connection clutch 52 of the first add-on tray LT1 becomes activated (e.g., ON) (e.g., timing T33). In response, the cam 74 of the first add-on tray LT1 starts rotating. In accordance with the rotation of the cam 74, the connectable member 85 of the coupling 73 moves from the connected position toward the disconnected position and the detection signal outputted by the connection detection sensor 102 is changed from the light blocking signal to the light receiving signal (e.g., timing T34).

Upon lapse of the first period from the timing at which the detection signal outputted by the connection detection sensor 102 was changed from the light blocking signal to the light receiving signal, the connection clutch 52 of the first add-on tray LT1 becomes deactivated (e.g., OFF) (e.g., timing T35). In response, the cam 74 stops rotating. In response, similar to the connectable member 85 of each of the third add-on trays LT3 and LT2, the connectable member 85 of the first add-on tray LT1 is also retained at the connected position. Thus, the driving force transmission mechanism 51 of the first add-on tray LT1 is maintained in the driving force blocking state.

<Another Example of how Image Forming Apparatus Behaves in Connection and Disconnection Switching Process>

FIG. 14 shows a timing diagram illustrating another example of how the image forming apparatus 11 behaves in the connection and disconnection switching process. The situation is assumed to be such that, while the driving force transmission mechanism 51 of the first, second, and third add-on trays LT1, LT2, and LT3 are all maintained in the driving force blocking state, a sheet feeding request for feeding one or more sheets from the third add-on tray LT3 is issued.

In response to the sheet feeding request, a request for driving the feed roller 32 of the third add-on tray LT3 is issued. In response, the main motor 41 becomes activated (e.g., ON) and then the connection clutch 52 of the first add-on tray LT1 becomes activated (e.g., ON) in order to transmit a driving force of the main motor 41 to each of the add-on trays LT2 and LT3 (e.g., timing T41). In response, the cam 74 of the driving force transmission mechanism 51 of the first add-on tray LT1 starts rotating. In accordance with the rotation of the cam 74, the connectable member 85 of the coupling 73 of the driving force transmission mechanism 51 moves from the disconnected position toward the connected position and the detection signal outputted by the connection detection sensor 102 is changed from the light receiving signal to the light blocking signal (e.g., timing T42).

Upon lapse of the predetermined period from the timing at which the detection signal sent from the connection detection sensor 102 was changed from the light receiving signal to the light blocking signal, the connection clutch 52 of the first add-on tray LT1 becomes deactivated (e.g., OFF) (e.g., timing T43). In response, the cam 74 stops rotating and the connectable member 85 is retained at the connected position. Thus, the driving force transmission mechanism 51 of the first add-on tray LT1 is maintained in the driving force transmitting state.

Thereafter, the connection clutch 52 of the second add-on tray LT2 becomes activated (e.g., ON) in order to transmit a driving force of the main motor 41 to the third add-on tray LT3 (e.g., timing T44). In response, the cam 74 of the driving force transmission mechanism 51 of the second add-on tray LT2 starts rotating. In accordance with the rotation of the cam 74, the connectable member 85 of the coupling 73 of the driving force transmission mechanism 51 moves from the disconnected position toward the connected position and the detection signal outputted by the connection detection sensor 102 is changed from the light receiving signal to the light blocking signal (e.g., timing T45).

Upon lapse of the first period from the timing at which the detection signal outputted from the connection detection sensor 102 was changed from the light receiving signal to the light blocking signal, the connection clutch 52 of the second add-on tray LT2 becomes deactivated (e.g., OFF) (e.g., timing T46). In response, the cam 74 stops rotating, and similar to the connectable member 85 of the first add-on tray LT1, the connectable member 85 of the second add-on tray LT2 is also retained at the connected position. Thus, the driving force transmission mechanism 51 of the second add-on tray LT2 is maintained in the driving force transmitting state.

Thereafter, the connection clutch 52 of the third add-on tray LT3 becomes activated (e.g., ON) (e.g., timing T47). In response, the cam 74 of the driving force transmission mechanism 51 of the third add-on tray LT3 starts rotating. In accordance with the rotation of the cam 74, the connectable member 85 of the coupling 73 of the driving force transmission mechanism 51 moves from the disconnected position toward the connected position and the detection signal outputted by the connection detection sensor 102 is changed from the light receiving signal to the light blocking signal (e.g., timing T48).

Upon lapse of the first period from the timing at which the detection signal outputted from the connection detection sensor 102 was changed from the light receiving signal to the light blocking signal, the connection clutch 52 of the third add-on tray LT3 becomes deactivated (e.g., OFF) (e.g., timing T49). In response, the cam 74 stops rotating, and similar to the connectable member 85 of each of the first and second add-on trays LT1 and LT2, the connectable member 85 of the third add-on tray LT3 is retained at the connected position. Thus, the driving force transmission mechanism 51 of the third add-on tray LT3 is maintained in the driving force transmitting state.

When a predetermined sheet feed timing comes, the sheet feed clutch 53 of the third add-on tray LT3 becomes activated (e.g., ON) (e.g., timing T50). In one example, a driving force transmitter for transmitting a driving force to the feed roller 32 may be configured to, when the sheet feed clutch 53 is being activated, transmit a driving force to the feed roller 32, and when the sheet feed clutch 53 is being deactivated, to block transmission of a driving force to the feed roller 32. In another example, another configuration that may implement a similar function to the coupling 73 and the cam 74 may be provided for transmitting a driving force in a driving force transmission mechanism, in conjunction with the sheet feed clutch 53. In this case, in response to activation of the sheet feed clutch 53, the state of the alternative configuration may be changed between the driving force transmitting state and the driving force blocking state. Further, in response to deactivation of the sheet feed clutch 53, the alternative configuration is maintained in one of the driving force transmitting state and the driving force blocking state.

In a case illustrated in the timing diagram of FIG. 14, upon lapse of the predetermined period since the sheet feed clutch 53 became activated (e.g., ON), the sheet feed clutch 53 becomes deactivated (e.g., OFF) (e.g., timing T51) and the driving force transmission mechanism 51 is thus maintained in the driving force transmitting state. While the driving force transmission mechanism 51 is maintained in the driving force transmitting state, the feed roller 32 rotates to feed, one by one, a sheet of one or more sheets supported by the sheet support plate 31.

In response to passing of a trailing edge of the sheet fed from the sheet support plate 31 through a predetermined position in the extension path 34 (e.g., in response to detection of the passing of the trailing edge of the sheet by a sensor), a request for stopping driving of the feed roller 32 of the third add-on tray LT3 is issued.

In response to the request for stopping driving of the feed roller 32 of the third add-on tray LT3, the sheet feed clutch 53 of the third add-on tray LT3 becomes activated (e.g., OFF) again (e.g., timing T52). Upon lapse of the predetermined period, the sheet feed clutch 53 becomes deactivated (e.g., OFF) (e.g., timing T53). With such a control, the driving force transmission mechanism 51 is transitioned from the driving force transmitting state, in which a driving force is allowed to be transmitted to the feed roller 32, to the driving force blocking state, in which a driving force is not allowed to be transmitted to the feed roller 32. Thus, the feed roller 32 stops rotating.

Thereafter, because it becomes unnecessary to retain the connectable member 85 of each of the first, second, and third add-on trays LT1, LT2, and LT3 at the connected position, the image forming apparatus 11 performs, between timing T54 and timing T62, the same or similar steps to those that the image forming apparatus 11 performs between timing T27 and timing T35 of FIG. 13.

<Effects>

In the illustrative embodiment, the coupling 73 includes the connectable members 83 and 85. The connectable member 85 is movable between the connected position, at which the connectable member 85 is connected to the connectable member 83, and the disconnected position, at which the connectable member 85 is separated from the connectable member 83. In a state where the connectable member 85 is connected to the connectable member 83 at the connected position, the coupling 73 enables a driving force of the main motor 41 to be transmitted to one or more driving members, such as the sheet support plate driving mechanism for moving the sheet support plate 31 up and down, and the feed roller 32. In the state where the connectable member 85 is separated from the connectable member 83 at the disconnected position, the coupling 73 does not enable a driving force of the main motor 41 to any driving members.

The connectable member 85 is configured to move between the connected position and the disconnected position in accordance with rotation of the cam 74. The cam 74 is configured to rotate by a driving force of the main motor 41. For starting and stopping rotation of the cam 74, the connection clutch 52 is provided. While the connection clutch 52 is activated, a driving force of the main motor 41 is transmitted to the cam 74. Therefore, the cam 74 rotates by the driving force. While the connection clutch 52 is deactivated, a driving force of the main motor 41 is not transmitted to the cam 74. Therefore, the cam 73 remains stopping.

As illustrated in FIG. 14, in response to the request for driving the feed roller 32, the first clutch-activation process is executed. In response to the request for stopping driving of the feed roller 32, the second clutch-activation process is executed. In the first clutch-activation process, the connection clutch 52 becomes activated, and in response, the cam 74 starts rotating. When the cam 74 enters the first state where the cam 74 enables the connectable member 85 to be located at the connected position, the connection clutch 52 becomes deactivated. In the second clutch-activation process, the connection clutch 52 becomes activated, and in response, the cam 74 starts rotating. When the cam 74 enters the second state where the cam 74 enables the connectable member 85 to be located in the disconnected position, the connection clutch 52 becomes deactivated. Thus, for the duration from the deactivation of the connection clutch 52 in the first clutch-activation process to the re-activation of the connection clutch 52 in the second clutch-activation process, the cam 74 is maintained in the first state where the cam 74 enables the connectable member 85 to be located at the connected position. Therefore, for such a duration, a driving force of the main motor 41 is allowed to be transmitted to the feed roller 32 to drive the feed roller 32 without the need for activation of the connection clutch 52.

Consequently, the configuration according to the illustrative embodiment may enable the connection clutch 52 to consume less power as compared with a configuration that requires constant activation of the connection clutch 52 while the feed roller 32 is driven.

<Variations>

While the disclosure has been described in detail with reference to the specific embodiment thereof, this is merely an example, and various changes, arrangements and modifications may be applied therein without departing from the spirit and scope of the disclosure.

In the illustrative embodiment, an optical sensor is used as the connection detection sensor 102 for detecting the position (e.g., the connected position or the disconnected position) of the connectable member 85. Nevertheless, the connection detection sensor 102 is not necessarily limited to the optical sensor. In some variations, for example, any sensor that may detect the state of the cam 74 or a microswitch that may detect the position of the connectable member 85 directly may be used as the connection detection sensor 102.

What is claimed is:

1. An image forming apparatus, comprising:
a motor configured to generate a driving force;
a first tray configured to support one or more sheets;
a second tray configured to support one or more sheets, the second tray including:
a first coupling including a first connectable member and a second connectable member, the second connectable member being movable between a first connected position at which the second connectable member is connected to the first connectable member and a first disconnected position at which the second connectable member is separated from the first connectable member, the first coupling configured to allow the driving force to be transmitted when the second connectable member is in the first connected position and block the driving force to be transmitted when the second connectable member is in the first disconnected position;
a first cam configured to be rotated by the driving force to be placed in one of a driving force transmitting state in which the second connectable member is located at the first connected position and a driving force blocking state in which the second connectable member is located at the first disconnected position; and
a first clutch configured to allow the first cam to rotate when activated and prevent the first cam from rotating when deactivated;
an image forming unit configured to form an image on a sheet fed from the first tray and configured to form an image on a sheet fed from the second tray; and
a controller comprising:
a processor; and
memory having computer readable instructions stored therein that, when executed by the processor, cause the controller to:
activate the first clutch in response to a particular condition being satisfied and deactivate the first clutch in response to the first cam being placed in the driving force transmitting state.

2. The image forming apparatus according to claim 1, wherein the computer readable instructions, when executed by the processor, cause the controller to:
activate the first clutch in response to another particular condition being satisfied and deactivate the first clutch in response to the first cam being placed in the driving force blocking state.

3. The image forming apparatus according to claim 1, wherein the second tray further comprises a first sensor configured to output a detection signal having a first level in response to the first cam being placed in the driving force blocking state and output a detection signal having a second level in response to the first cam being placed in the driving force transmitting state, and
wherein the computer readable instructions, when executed by the processor, cause the controller to deactivate the first clutch in response to a level of the detection signal outputted from the first sensor changing with activation of the first clutch.

4. The image forming apparatus according to claim 3, further comprising a third tray configured to support one or more sheets, the third tray including:
a second coupling including a third connectable member and a fourth connectable member, the fourth connectable member being movable between a second connected position at which the fourth connectable member is connected to the third connectable member and a second disconnected position at which the fourth connectable member is separated from the third connectable member, the second coupling configured to allow the driving force to be transmitted when the fourth connectable member is in the second connected position and block the driving force to be transmitted when the fourth connectable member is in the second disconnected position;
a second cam configured to be rotated by the driving force to be placed in one of a driving force transmitting state in which the fourth connectable member is located at the second connected position and a driving force blocking state in which the fourth connectable member is located at the second disconnected position;
a second clutch configured to allow the second cam to rotate when activated and prevent the second cam from rotating when deactivated; and a second sensor configured to output a detection signal having a first level in response to the second cam being placed in the driving force blocking state and output a detection signal having a second level in response to the second cam being placed in the driving force transmitting state, wherein the image forming unit is configured to form an image on a sheet fed from the third tray;

wherein the computer readable instructions, when executed by the processor, cause the controller to:

activate the second clutch of the third tray in response to a condition being satisfied to transmit the driving force to the second cam of the third tray; and deactivate the second clutch of the third tray in response to the level of the detection signal outputted from the second sensor of the third tray changing from the first level to the second level.

5. The image forming apparatus according to claim 4, wherein the computer readable instructions, when executed by the processor, cause the controller to activate the second clutch of the third tray after deactivating the first clutch of the second tray.

6. The image forming apparatus according to claim 5, wherein the third tray includes a roller being contactable with a sheet supported by the third tray, wherein the second coupling of the third tray is configured to allow the driving force to be transmitted to the roller, and wherein the computer readable instructions, when executed by the processor, cause the controller to:

activate the first clutch of the second tray in response to a request being issued for the sheet to be from the third tray;

after deactivating the first clutch of the second tray in response to the level of the detection signal outputted from the first sensor of the second tray changing from the first level to the second level, activate the second clutch of the third tray; and deactivate the second clutch of the third tray in response to the level of the detection signal outputted from the second sensor of the third tray changing from the first level to the second level.

7. The image forming apparatus according to claim 5, wherein the first sensor is configured to output the detection signal having the second level in response to the first cam being placed in a state in which the second connectable member is between the first connected position and the first disconnected position, wherein the second sensor is configured to output the detection signal having the second level in response to the second cam being placed in a state in which the fourth connectable member is between the second connected position and the second disconnected position, wherein the computer readable instructions, when executed by the processor, cause the controller to:

activate the first clutch of the second tray in response to the level of the detection signal outputted from the second sensor of the third tray being the second level;

after deactivating the first clutch of the second tray in response to the level of the detection signal outputted from the first sensor of the second tray changing from the first level to the second level, activate the second clutch of the third tray; and deactivate the second clutch of the third tray in response to the level of the detection signal outputted from the second sensor of the third tray changing from the second level to the first level.

8. The image forming apparatus according to claim 7, wherein the computer readable instructions, when executed by the processor, cause the controller to activate the first clutch of the second tray in response to the level of the detection signal outputted from the second sensor of the third tray being the second level after power of the image forming apparatus is turned on.

9. The image forming apparatus according to claim 4, wherein the computer readable instructions, when executed by the processor, cause the controller to:

activate the second clutch of the third tray in response to a condition being satisfied to block the driving force to be transmitted to the first and second cams; and deactivate the second clutch of the third tray in response to the level of the detection signal outputted from the second sensor of the third tray changing from the second level to the first level.

10. The image forming apparatus according to claim 9, wherein the computer readable instructions, when executed by the processor, cause the controller to:

after deactivating the second clutch of the third tray, activate the first clutch of the second tray; and deactivate the first clutch of the second tray in response to the level of the detection signal outputted from the first sensor of the second tray changing from the second level to the first level.

11. The image forming apparatus according to claim 4, further comprising a housing that supports the image forming unit, the motor being disposed in the housing.

12. The image forming apparatus according to claim 3, wherein the computer readable instructions, when executed by the processor, cause the controller to:

upon lapse of a period from a timing at which the level of the detection signal outputted from the first sensor is changed with activation of the first clutch, deactivate the first clutch.

13. The image forming apparatus according to claim 12, wherein the motor has a first mode in which the motor rotates at a first rotating speed and a second mode in which the motor rotates at a second rotating speed slower than the first rotating speed, and wherein the computer readable instructions, when executed by the processor, cause the controller to:

specify a duration of the period associated with the first rotating speed when the motor operates in the first mode; and specify a duration of the period associated with the second rotating speed when the motor operates in the second mode, the duration of the period when the motor operates in the second mode being longer than the duration of the period when the motor operates in the first mode.

14. The image forming apparatus according to claim 3, wherein the computer readable instructions, when executed by the processor, cause the controller to:

determine that an error has occurred in response to the level of the detection signal outputted by the first sensor not being changed although a period from a timing at which the first clutch is activated lapses.

15. The image forming apparatus according to claim 14, wherein the motor has a first mode in which the motor rotates at a first rotating speed and a second mode in which the motor rotates at a second rotating speed slower than the first rotating speed, and wherein the computer readable instructions, when executed by the processor, cause the controller to:
specify a duration of the period associated with the first rotating speed when the motor operates in the first mode; and
specify a duration of the period associated with the second rotating speed when the motor operates in the second mode, the duration of the period when the motor operates in the second mode being longer than the duration of the period when the motor operates in the first mode.

16. The image forming apparatus according to claim 4, wherein the second tray is connected to the first tray and the third tray, the second tray being disposed between the first tray and the third tray.

17. An image forming apparatus, comprising:
a motor configured to generate a driving force;
a first tray configured to support one or more sheets;
a second tray configured to support one or more sheets, the second tray including:
a first coupling including a first connectable member and a second connectable member, the second connectable member being movable between a first connected position at which the second connectable member is connected to the first connectable member and a first disconnected position at which the second connectable member is separated from the first connectable member, the first coupling configured to allow the driving force to be transmitted when the second connectable member is in the first connected position and block the driving force to be transmitted when the second connectable member is in the first disconnected position;
a first cam configured to be rotated by the driving force to be placed in one of a driving force transmitting state in which the second connectable member is located at the first connected position and a driving force blocking state in which the second connectable member is located at the first disconnected position; and
a first clutch configured to allow the first cam to rotate when activated and prevent the first cam from rotating when deactivated;
an image forming unit configured to form an image on a sheet fed from the first tray and configured to form an image on a sheet fed from the second tray; and
a controller comprising:
a processor; and
memory having computer readable instructions stored therein that, when executed by the processor, cause the controller to:
activate the first clutch in response to a particular condition being satisfied and deactivate the first clutch in response to the first cam being placed in the driving force blocking state,
wherein the second tray further comprises a first sensor configured to output a detection signal having a first level in response to the first cam being placed in the driving force blocking state and output a detection signal having a second level in response to the first cam being placed in the driving force transmitting state, and
wherein the computer readable instructions, when executed by the processor, cause the controller to:
deactivate the first clutch in response to a level of the detection signal outputted from the first sensor changing with activation of the first clutch.

18. The image forming apparatus according to claim 17, further comprising a third tray configured to support one or more sheets, the third tray including a second load driven by the driving force, the third tray including:
a second coupling including a third connectable member and a fourth connectable member, the fourth connectable member being movable between a second connected position at which the fourth connectable member is connected to the third connectable member and a second disconnected position at which the fourth connectable member is separated from the third connectable member, the second coupling configured to allow the driving force to be transmitted when the fourth connectable member is in the second connected position and block the driving force to be transmitted when the fourth connectable member is in the second disconnected position;
a second cam configured to be rotated by the driving force to be placed in one of a driving force transmitting state in which the fourth connectable member is located at the second connected position and a driving force blocking state in which the fourth connectable member is located at the second disconnected position;
a second clutch configured to allow the second cam to rotate when activated and prevent the second cam from rotating when deactivated; and
a second sensor configured to output a detection signal having a first level in response to the second cam being placed in the driving force blocking state and output a detection signal having a second level in response to the second cam being placed in the driving force transmitting state,
wherein the image forming unit is configured to form an image on a sheet fed from the third tray;
wherein the computer readable instructions, when executed by the processor, cause the controller to:
activate the second clutch of the third tray in response to a condition being satisfied to transmit the driving force to the second cam of the third tray; and
deactivate the second clutch of the third tray in response to the level of the detection signal outputted from the second sensor of the third tray changing from the first level to the second level.

19. An image forming system, comprising:
an image forming apparatus comprising:
a motor configured to generate a driving force;
a first tray configured to support one or more sheets; and
an image forming unit configured to form an image on a sheet fed from the first tray; and
a second tray configured to support one or more sheets, the second tray including:
a coupling including a first connectable member and a second connectable member, the second connectable member being movable between a connected position at which the second connectable member is connected to the first connectable member and a disconnected position at which the second connectable member is separated from the first connectable member, the coupling configured to allow the driving force to be transmitted when the second connectable member is in the connected position and block the driving force to be transmitted when the second connectable member is in the disconnected position;
a cam configured to be rotated by the driving force to be placed in one of a driving force transmitting state in which the second connectable member is located at the connected position and a driving force blocking state in which the second connectable member is located at the disconnected position; and
a clutch configured to allow the cam to rotate when activated and prevent the cam from rotating when deactivated; and
a computer readable medium storing computer readable instructions that, when executed, are configured to:
activate the clutch in response to a particular condition being satisfied and deactivate the clutch in response to the cam being placed in the driving force transmitting state,
wherein the image forming unit is configured to form an image on a sheet fed from the second tray; and
wherein the image forming apparatus further comprises a controller comprising:
a processor configured to execute the computer readable instructions.

* * * * *